US009524291B2

(12) United States Patent
Teodosiu et al.

(10) Patent No.: US 9,524,291 B2
(45) Date of Patent: Dec. 20, 2016

(54) VISUAL DISPLAY OF SEMANTIC INFORMATION

(75) Inventors: Dan Teodosiu, Boulogne-Billancourt (FR); Elizabeth Ireland Powers, Paris (FR); Pierre Serge Vincent LeRoy, Maisons-Laffitte (FR); Sebastien Jean-Marie Christian Saunier, Paris (FR)

(73) Assignee: Virtuoz SA, Paris (FR)

( * ) Notice: Subject to any disclaimer, the term of this patent is extended or adjusted under 35 U.S.C. 154(b) by 497 days.

(21) Appl. No.: 12/899,016

(22) Filed: Oct. 6, 2010

(65) Prior Publication Data

US 2012/0089394 A1 Apr. 12, 2012

(51) Int. Cl.
*G10L 21/06* (2013.01)
*G06F 17/21* (2006.01)
*G06F 17/20* (2006.01)
*G06F 17/27* (2006.01)

(52) U.S. Cl.
CPC ........... *G06F 17/2785* (2013.01); *G06F 17/20* (2013.01); *G06F 17/21* (2013.01); *G06F 17/27* (2013.01); *G10L 21/06* (2013.01)

(58) Field of Classification Search
USPC ............. 704/1-8, 9, 10, 200, 231, 236-242, 704/243-245, 250-255, 270, 276, 704/E15.001-E15.05
See application file for complete search history.

(56) References Cited

U.S. PATENT DOCUMENTS 4,994,983 A * 2/1991 Landell et al. ............... 704/245
5,519,608 A * 5/1996 Kupiec ............................. 704/9
5,528,491 A * 6/1996 Kuno et al. ....................... 704/9
5,680,511 A * 10/1997 Baker et al. .................. 704/257
5,696,962 A * 12/1997 Kupiec
5,799,268 A * 8/1998 Boguraev ......................... 704/9
5,828,999 A 10/1998 Bellegarda et al.
5,873,056 A 2/1999 Liddy et al.
5,966,686 A * 10/1999 Heidorn et al. .................. 704/9
5,995,922 A * 11/1999 Penteroudakis et al. ......... 704/9
6,081,774 A * 6/2000 de Hita et al. .................... 704/9
6,243,669 B1 * 6/2001 Horiguchi et al. ............... 704/9
6,246,977 B1 6/2001 Messerly et al.
6,256,629 B1 7/2001 Sproat et al.
6,356,864 B1 3/2002 Foltz et al.
(Continued)

FOREIGN PATENT DOCUMENTS

WO WO 96/13830 5/1996
WO WO-2011119171 9/2011
WO WO-2012047214 4/2012

OTHER PUBLICATIONS

PCT Search Report and Written Opinion, Application No. PCT/US2010/028898, (Mar. 25, 2011),9 pages.
(Continued)

*Primary Examiner* — Pierre-Louis Desir
*Assistant Examiner* — David Kovacek
(74) *Attorney, Agent, or Firm* — Hamilton, Brook, Smith & Reynolds, P.C.

(57) ABSTRACT

Techniques involving visual display of information related to matching user utterances against graph patterns are described. In one or more implementations, an utterance of a user is obtained that has been indicated as corresponding to a graph pattern through linguistic analysis. The utterance is displayed in a user interface as a representation of the graph pattern.

17 Claims, 16 Drawing Sheets

(56) References Cited

U.S. PATENT DOCUMENTS 6,411,924 B1* 6/2002 de Hita et al. .................... 704/9
6,415,257 B1 7/2002 Junqua et al.
6,442,524 B1* 8/2002 Ecker et al. .................. 704/277
6,470,306 B1* 10/2002 Pringle et al. .................... 704/3
6,745,161 B1* 6/2004 Arnold et al. .................... 704/7
6,760,695 B1* 7/2004 Kuno et al. ....................... 704/9
6,910,003 B1* 6/2005 Arnold et al. .................... 704/4
6,993,475 B1* 1/2006 McConnell et al. .............. 704/7
7,013,264 B2* 3/2006 Dolan ............... G06F 17/30684 704/9
7,406,456 B2 7/2008 Calistri-Yeh et al.
7,689,410 B2* 3/2010 Chang et al. ..................... 704/9
7,877,371 B1 1/2011 Lerner et al.
7,882,055 B2* 2/2011 Estes ............................... 706/52
7,912,720 B1 3/2011 Hakkani-Tur et al.
8,170,969 B2* 5/2012 Roettger et al. ................ 706/45
8,180,627 B2 5/2012 Bogl et al.
8,515,736 B1 8/2013 Duta
8,676,565 B2 3/2014 Larcheveque et al.
8,694,304 B2* 4/2014 Larcheveque ...... G06F 17/2785 704/1
8,977,953 B1* 3/2015 Pierre ................. G06F 17/2785 715/201
9,275,042 B2 3/2016 Larcheveque et al.
9,378,202 B2 6/2016 Larcheveque et al.
2001/0049601 A1* 12/2001 Kroeker ................ G06F 17/271 704/254
2002/0002454 A1 1/2002 Bangalore et al.
2002/0059069 A1* 5/2002 Hsu ......................... G10L 15/18 704/257
2002/0188448 A1 12/2002 Goodman et al.
2003/0130837 A1* 7/2003 Batchilo et al. .................. 704/9
2003/0130976 A1* 7/2003 Au .................................. 706/55
2003/0171915 A1* 9/2003 Barklund et al. ................. 704/9
2003/0176999 A1* 9/2003 Calcagno et al. ................ 704/9
2003/0182631 A1 9/2003 Tsochantaridis et al.
2003/0191627 A1* 10/2003 Au ...................... G06F 17/2785 704/9
2004/0054521 A1* 3/2004 Liu ................................... 704/5
2004/0117449 A1 6/2004 Newman et al.
2004/0162806 A1* 8/2004 Liu ................................... 707/1
2005/0091030 A1 4/2005 Jessee et al.
2005/0105712 A1* 5/2005 Williams et al. ........ 379/265.02
2005/0125217 A1 6/2005 Mazor
2005/0251382 A1* 11/2005 Chang et al. ..................... 704/9
2005/0251383 A1 11/2005 Murray
2005/0278613 A1 12/2005 Morinaga et al.
2006/0053043 A1 3/2006 Clarke
2006/0129397 A1 6/2006 Li et al.
2006/0136375 A1 6/2006 Cox et al.
2006/0136403 A1 6/2006 Koo
2006/0217962 A1 9/2006 Asano
2006/0253431 A1* 11/2006 Bobick et al. .................... 707/3
2006/0253476 A1* 11/2006 Roth et al. .................... 707/100
2006/0293880 A1* 12/2006 Elshishiny et al. ............. 704/10
2007/0067157 A1 3/2007 Kaku et al.
2008/0195391 A1 8/2008 Marple et al.
2008/0275694 A1* 11/2008 Varone .............................. 704/9
2008/0319738 A1 12/2008 Liu et al.
2009/0030686 A1* 1/2009 Weng .................. G10L 15/1822 704/240
2009/0089046 A1* 4/2009 Uchimoto et al. ................ 704/9
2009/0160658 A1* 6/2009 Armstrong et al. ....... 340/573.1
2009/0306981 A1 12/2009 Cromack et al.
2010/0004923 A1 1/2010 Bogl et al.
2010/0005061 A1* 1/2010 Basco et al. ...................... 707/3
2010/0023482 A1 1/2010 Mershon et al.
2010/0161327 A1* 6/2010 Chandra et al. .............. 704/235
2011/0238408 A1 9/2011 Larcheveque
2011/0238409 A1 9/2011 Larcheveque
2011/0238410 A1 9/2011 Larcheveque
2011/0301941 A1* 12/2011 De Vocht .......................... 704/9
2012/0089394 A1* 4/2012 Teodosiu et al. ............. 704/235
2012/0233188 A1 9/2012 Majumdar
2012/0259856 A1 10/2012 Gehrking et al.
2014/0200891 A1* 7/2014 Larcheveque ...... G06F 17/2785 704/243
2014/0207441 A1 7/2014 Larcheveque et al.
2016/0239480 A1 8/2016 Larcheveque et al.

OTHER PUBLICATIONS

Corrected PCT Search Report and Written Opinion, Application No. PCT/US10/51616, Jul. 30, 2012, 7 pages.

PCT Search Report and Written Opinion, Application No. PCT/US2010/051616, Jul. 5, 2012, 7 pages.

Budanitsky, A., et al. "Evaluating Wordnet-Based Measures of Lexical Semantic Relatedness" *Computational Linguistics*, 32.1:13-47 (2006).

Lee et al. "Automatic Agenda Graph Construction from Human-Human Dialogs using Clustering Method". Proceedings of Human Language Technologies: The 2009 Annual Conference of the North American Chapter of the Association for Computational Linguistics, May 31-Jun. 5, 2009, Boulder, Colorado.

* cited by examiner

600

700

1400

Agent answer: CancelBid_HowTo

Whether you can cancel a bid depends on when you placed the bid and why you need to cancel it. Please tell me the item number for the bid you would like to cancel. (edit)

Patterns that trigger this answer upon receipt...

- 😊 how do i cancel a bid
- how to cancel bidding
- how to cancel bids
- how to cancell bid for nikes
- how to cancel bid

[Move 902] [Disable 902] [Delete 902]

- ☹ i want to cancel a bid
- ✗ no user input matched "show me how to cancel bidding"

Patterns that add this answer to a list of reformulations.....

- 😊 how do i cancel a bid
- ☹ i want to cancel a bid
- ✗ no user input matched "cancel bid"

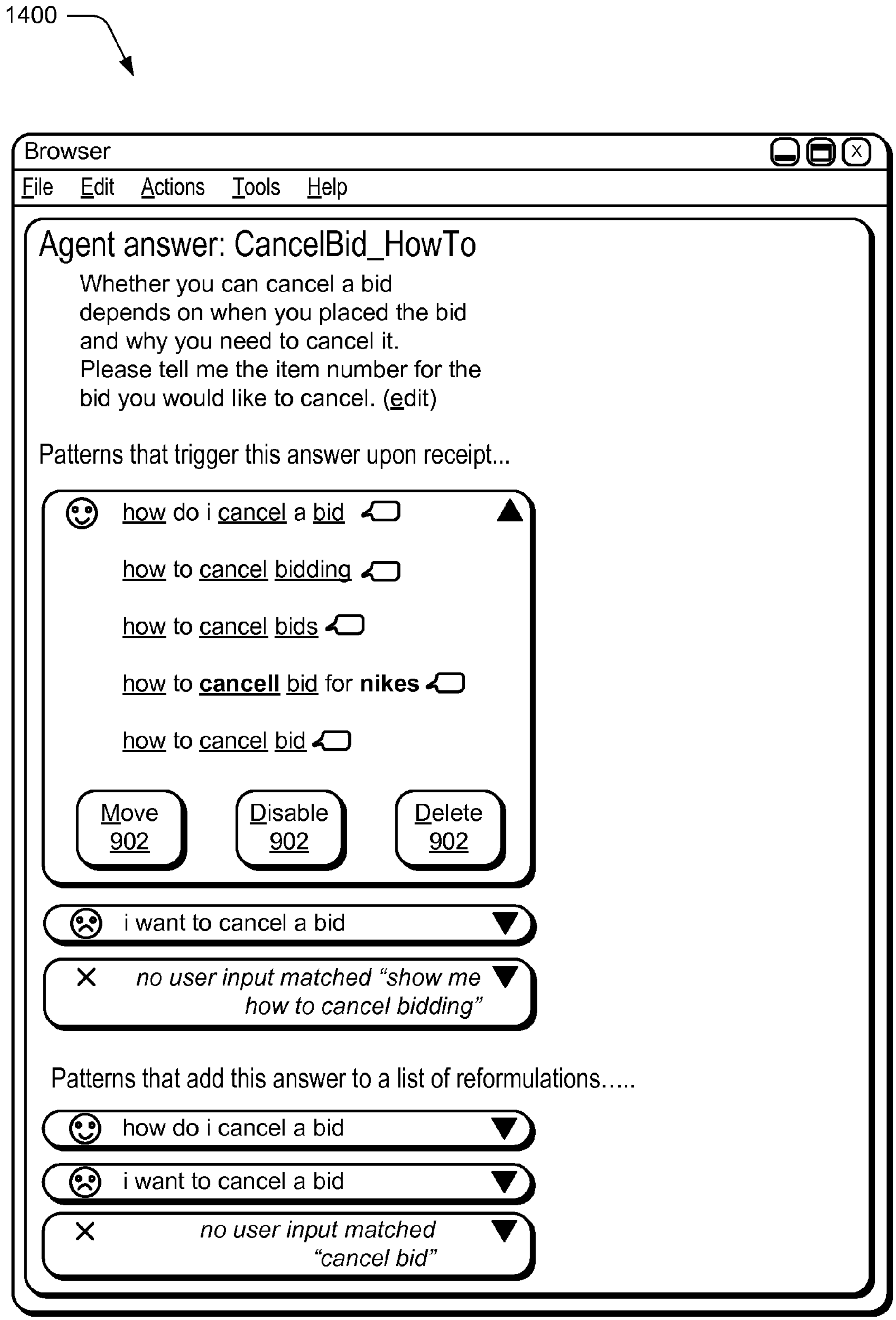

*Fig. 14*

VISUAL DISPLAY OF SEMANTIC INFORMATION

BACKGROUND

Companies continue to develop an ever increasing variety of techniques to interact with customers. For example, a company may provide a website that includes details about products and/or services of the company. Additionally, the website may include support information, or functionality to purchase products and services from the company. A customer, for instance, may interact with the website to find information about a prospective purchase and later, after the purchase, to find information regarding use of the purchase. Consequently, the amount of information that is made available via these techniques is ever-increasing, which may make it difficult for customers to locate desired information using traditional techniques.

One such traditional technique that has been employed by the companies involves the use of search technologies. For example, the company may include search technologies on a website to allow customers to hunt for answers to their questions. This may work well for certain types of queries and issues, but may fail as questions become increasingly complex, as issue resolution may require personalized information, and so on. As a result, users may "walk away" from the website frustrated, may make a time-consuming call to a human customer service representative (CSR), and so on. Therefore, traditional search techniques may have a negative impact on user experience with the website and consequently on the user's view of the company as a whole.

SUMMARY

Techniques involving visual display of information related to matching user utterances against graph patterns are described. In one or more implementations, an utterance of a user is obtained that has been indicated as corresponding to a graph pattern through linguistic analysis. The utterance is displayed in a user interface as a representation of the graph pattern.

In one or more implementations, one or more utterances are obtained that have been indicated as not included in a lexicon used for linguistic analysis. The one or more utterances are displayed in an order of frequency in a user interface.

In one or more implementations, a plurality of utterances is obtained that have been indicated as not included in a lexicon used for linguistic analysis. Each of the utterances is identified during the linguistic analysis that involves forming a user input that includes the utterance into a semantic graph and comparing the semantic graphic with one or more graph patterns of an intent to determine whether the utterance corresponds to the intent. The plurality of utterances are displayed, each with a respective result of a spell check operation performed using the utterance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 14 is an illustration of an example user interface showing both minimized and maximized representations of patterns of a single intent.

DETAILED DESCRIPTION

Overview

Figure 1:
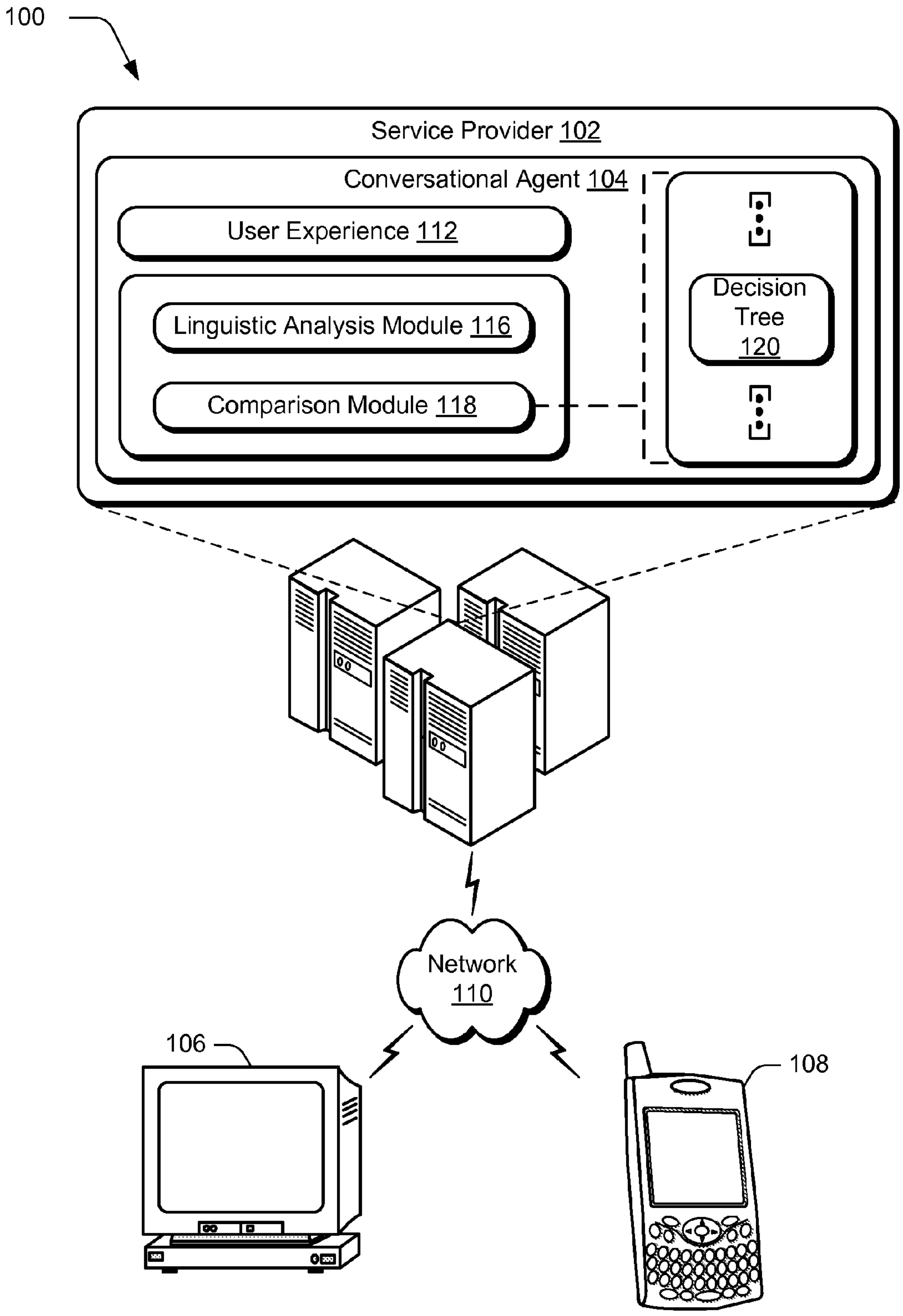
FIG. 1 is an illustration of an environment in an example implementation that is operable to perform linguistic processing techniques for a conversational agent.

Users may have access to an ever-increasing variety of information from an ever-increasing variety of sources, such as via a website, mobile communications device, email, instant messaging, and so on. Consequently, it has become increasingly difficult for a user to locate desired information from within this variety of information, which may lead to user frustration with the traditional techniques used to access the information as well as the provider of the information, e.g., the company itself.

Conversational agent techniques are described, which include linguistic analysis and other functionalities that are described in the following sections. In various implementations, conversational agents are implemented using one or more modules to engage in an interactive natural language dialog with a user via a textual chat. Thus, use of conversational agents may provide automated assistance to users to help them resolve issues without directly interacting with a human agent (e.g., a customer support representative in a call center). This may help a company to efficiently utilize resources and provide additional functionality to a user that was not available via traditional search techniques. The textual chat may be inputted using a variety of mechanisms, such as transcripts of spoken words (such as telephone calls), text inputs (e.g., instant messages, live chat, email, SMS, blogging and micro-blogging services, and so on), automatic speech recognition, and so forth.

Through use of linguistic analysis techniques, the conversational agent may map user inputs (henceforth called "utterances") to semantic representations. Such representations may be graphs, the nodes of which represent concepts and the edges of which represent semantic roles. Such graphs will henceforth be called "semantic graphs".

The conversational agent may represent a user intent by an intent graph pattern or a plurality of intent graph patterns. Thus, a user utterance may be formed into a semantic graph and compared with intent graph patterns (henceforth called "graph patterns" or simply "patterns"). If there is a match then the utterance likely involves the intent represented by the graph pattern or plurality of graph patterns.

Identification of patterns that are matched to a too-broad, too-specific, or incorrect group of utterances may be used to improve a conversational agent. For example, a pattern that is too specific will fail to match utterances to the correct intent whereas a pattern that is too general may result in an agent intent being activated in response to utterances that should not trigger that intent.

Traditional techniques that were employed to evaluate whether a pattern is correct, however, generally did not take into account the range of utterances that a user may submit to the conversational agent. In the following discussion, techniques are described in which a pattern's correctness may be judged by viewing which utterances are actually matched to it.

Additionally, traditional techniques that employed a matching system dependent on extensive knowledge of linguistics and semantic graphs to build and improve a conversational agent may be limited in terms of their ability to scale. Even for a trained reviewer, for example, it may be difficult to determine that a semantic graph will match appropriate utterances and not others. Using the visual representation techniques described herein, however, a reviewer who understands the conversational agent's business rules may detect patterns that do not behave as expected without an extensive knowledge of linguistics. Therefore, a pattern that is not functioning as intended may be removed, moved, fixed, and so on by a wider range of reviewers.

In the following discussion, an example environment is described along with example procedures that may be implemented in the example environment as well as in other environments. Accordingly, the example procedures are not limited to implementation in the example environments and the example environments are not limited to implementation of the example procedures.

Example Environment

FIG. 1 illustrates an example environment 100 that is operable to employ linguistic analysis techniques for a conversational agent. The illustrated environment 100 includes a service provider 102 having a conversational agent 104 that is accessible to a plurality of client devices 106, 108 over a network 110. The client devices 106, 108 may be configured in a variety of ways. For example, the client devices may be configured as a computing device that is capable of communicating over the network, such as a desktop computer as illustrated by client device 106, a mobile station, an entertainment appliance, a set-top box communicatively coupled to a display device, a wireless phone as illustrated by client device 108, a game console, and so forth. Thus, the client devices may range from full resource devices with substantial memory and processor resources (e.g., personal computers, game consoles) to a low-resource device with limited memory and/or processing resources (e.g., traditional set-top boxes, hand-held game consoles).

Likewise, the network 110 may assume a variety of configurations. For example, the network 110 may include a wide area network (WAN), a local area network (LAN), a wireless network, a public telephone network, an intranet, a telephone network, and so on. Further, although a single network 110 is shown, the network 110 may be configured to include multiple networks. For instance, the client device 106 configured as a desktop computer and the service provider 102 may be communicatively coupled via the Internet and the client device 108 configured as a wireless phone may be communicatively coupled to the service provider 102 via a telephone network. A wide variety of other instances are also contemplated.

The service provider 102 is illustrated as being implemented by one or more servers (or other computing devices) that are accessible to the client devices 106, 108 via the network 110. Additionally, the conversational agent 104 is illustrated as a module that is implemented by the service provider 102. For example, the conversational agent 104 may include a user experience 112 that is accessible via a webpage output by the service provider 102 to the client device 106 configured as a desktop computer. In another example, the conversational agent 104 may include a user experience 112 that is accessible via a spoken input received by the client device 108 configured as a wireless phone. Thus, user experience of the conversational agent 104 may be accessed through a wide variety of techniques. A variety of other examples are also contemplated, such as instant messaging, email, user-generated content in conjunction with a social network, blogging and micro-blogging services, and so on.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. In the case of a software implementation, the module and/or functionality represents instructions (e.g., program code) that perform specified tasks when executed on a processing system that may include one or more processors or other hardware. The program code can be stored in a wide variety of types and combinations of memory may be employed, such as random access memory (RAM), hard disk memory, removable medium memory, and other types of computer-readable media. The features of the semantic clustering techniques described below are platform-independent, meaning that the techniques may be implemented on a variety of commercial computing platforms having a variety of processors.

The conversational agent 104 is configured to engage in an interactive natural language dialog with a human user via textual chat, to complete a specific task for or on behalf of that user. For example, text entered by a user through interaction with the client device 106 configured as a desktop computer may be provided to the conversational agent 104. In another example, a voice input provided by the client device 108 configured as a wireless phone may be converted to text and processed by the conversational agent 104; the response of the conversational agent 104 can then be converted back to speech before being sent to the client device 108.

Tasks may include providing information to the user, answering the user's questions, helping the user solve a problem (support agent), proposing new products and services to the user (sales and/or marketing agent), and so on.

The conversational agent 104 may embed complex logic flows to aid interaction with the user using natural language. The conversational agent 104 may also interact with various application programming interfaces (APIs) and backend systems of a company that offers use of the agent, e.g., the service provider 102. For example, the conversational agent 104 may be offered as a visual avatar on a company web site (or a specific section of the site), but other interaction channels such as instant messaging systems, mobile phones, email, social networking sites, or blogging and microblogging services are also contemplated. The conversational agent 104 may respond to user questions and also drive the conversation to solicit specific information to better understand the user's situation.

Example Conversation Strategy

Utterances that are received (e.g., spoken or typed by a user) are parsed by a linguistic analysis module 116 of the conversational agent 104 and may be matched by a comparison module 118 against a number of possible intents that are part of one or more decision trees 120. Based on the identified intent, the conversational agent 104 may then generate a reply. A conversation between the user and the agent may include one or more of these interactions between the user and the conversational agent 104.

A user's intent can be expressed in a variety of ways. For example, the user's intent may be configured as a single information request, may include a set of several potential information requests, and so on. In the latter case, the conversational agent 104 may ask for clarification until a specific information request is identifiable and may be satisfied.

In one or more implementations, conversations are modeled as paths through a set of decision trees 120, which may be configured as circuit-like structures that describe possible conversation flows. The root of each decision tree 120 may describe an initial state, before a user intent has been identified. Leaves of the decision tree 120 may be thought of as answers to a specific request. Accordingly, a path from the root to a leaf of the decision tree 120 may represent a sequence of utterances (e.g., speech acts) that may lead to identification of the information requested by the user and thus completion of the conversational agent's 104 task. In addition to a simple traversal of the decision tree 120, the conversational agent 120 may offer increasingly complex dialog strategies that allow the user to switch between tasks (or decision trees) flexibly.

The set of intents that can be matched to user utterances at a particular point in time relates to a current position of a conversation in the decision tree 120. For example, a customer of a telecommunications company might initiate a conversation by asking, "Can I access my voice mail from the web?" Upon recognizing the intent of the question, the conversational agent 104 moves from the decision tree's 120 root node to one of the root's child nodes. Assuming that the company delivers phone services through a cellular network, landlines, and VOIP, the conversational agent 104 may consult the information that is relevant to proceed in the decision tree 120 and respond with a clarifying question, e.g., "What type of phone service do you use for your voice mail?"

Assuming the user answers with an utterance that includes sufficient information and is recognized by the agent, the conversational agent 104 has identified the user's intent and moves to a leaf node, which contains an answer to the user's question. It should be noted that a user utterance such as "VOIP" may be associated with a different intent when produced at the beginning of the conversation, at the root of the decision tree 120, as opposed to later in the conversation at the node corresponding to web access to voicemail.

In addition to the current position in the decision tree 120, the conversational agent 104 may have knowledge of pieces of information that were obtained earlier during the conversation. For example, this additional information may be represented as variable-value pairs, which may act to limit the user from asking a same question multiple times, asking for information that was already provided by user, and so on. Additionally, the conversational agent 104 may implement complex and sophisticated conversation strategies. For example, the conversational agent 104 may proactively ask questions and volunteer related pieces of information based on information known about the user from the conversation or other data collected about the user (e.g., via an API provided by the service provider 102 offering the conversational agent 104).

Matching User Utterances to User Intents

Figure 2:
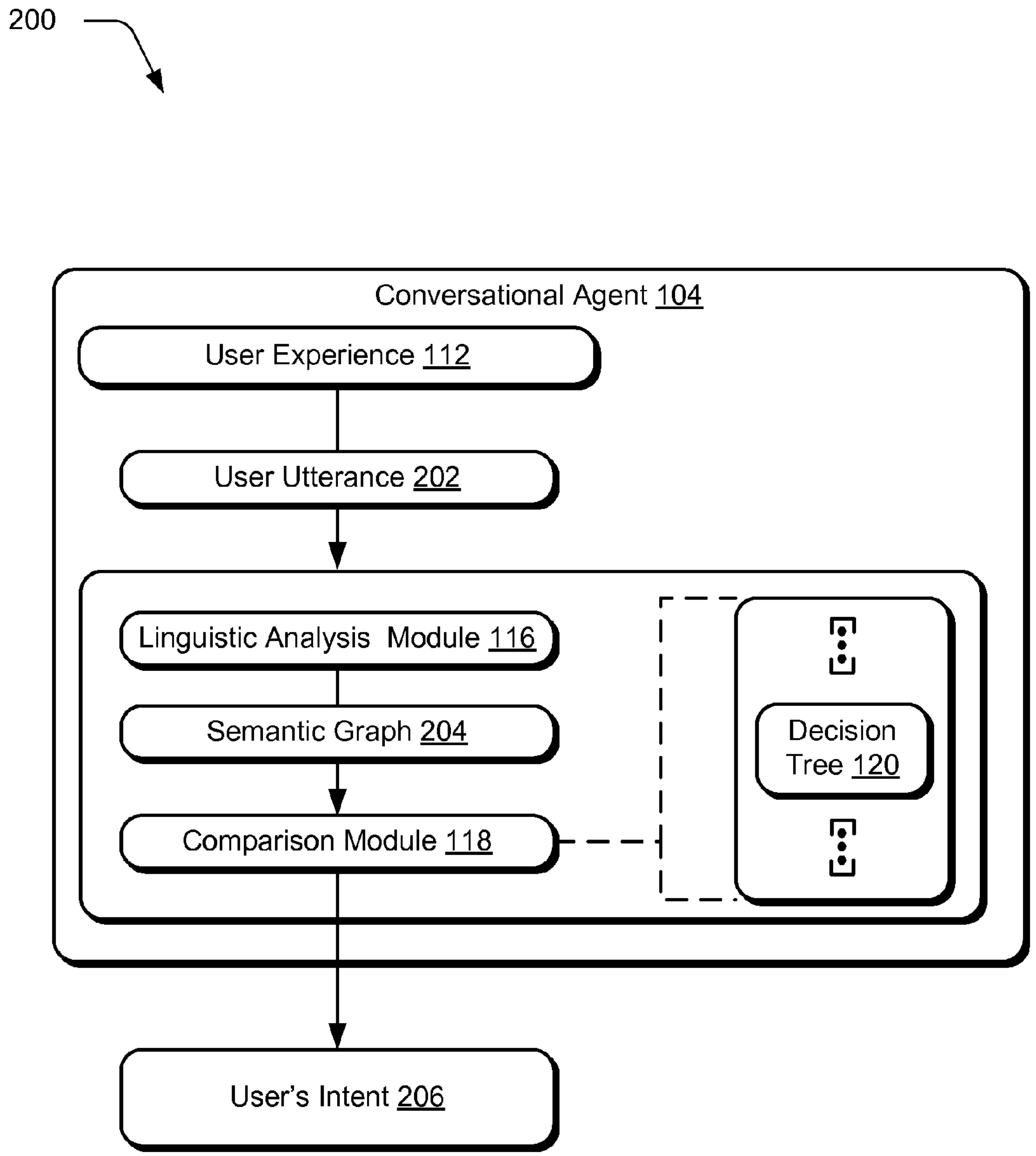
FIG. 2 illustrates an example implementation of a procedure to match a user utterance to likely user intents.

FIG. 2 illustrates an example implementation 200 of a procedure to match a user utterance to a likely intent. User utterance 202 is illustrated as being provided to the linguistic analysis module 116 via the user experience 112. Upon receipt of the user utterance 202, the linguistic analysis module 116 may form a semantic graph 204. The semantic graph 204 may then be leveraged by the comparison module 118 to determine a closest matching pattern through a decision tree 120 lookup, and from that, a user's intent 206. By using these techniques, the conversational agent 104 is configured to deal with "messy" and "real" user utterances 202. For example, the user utterance may contain a high percentage (over 50%) of misspelled, ungrammatical or incomplete sentences, abbreviations, slang, and so on.

Parsing and Semantic Representations of Input Sentences

Figure 3:
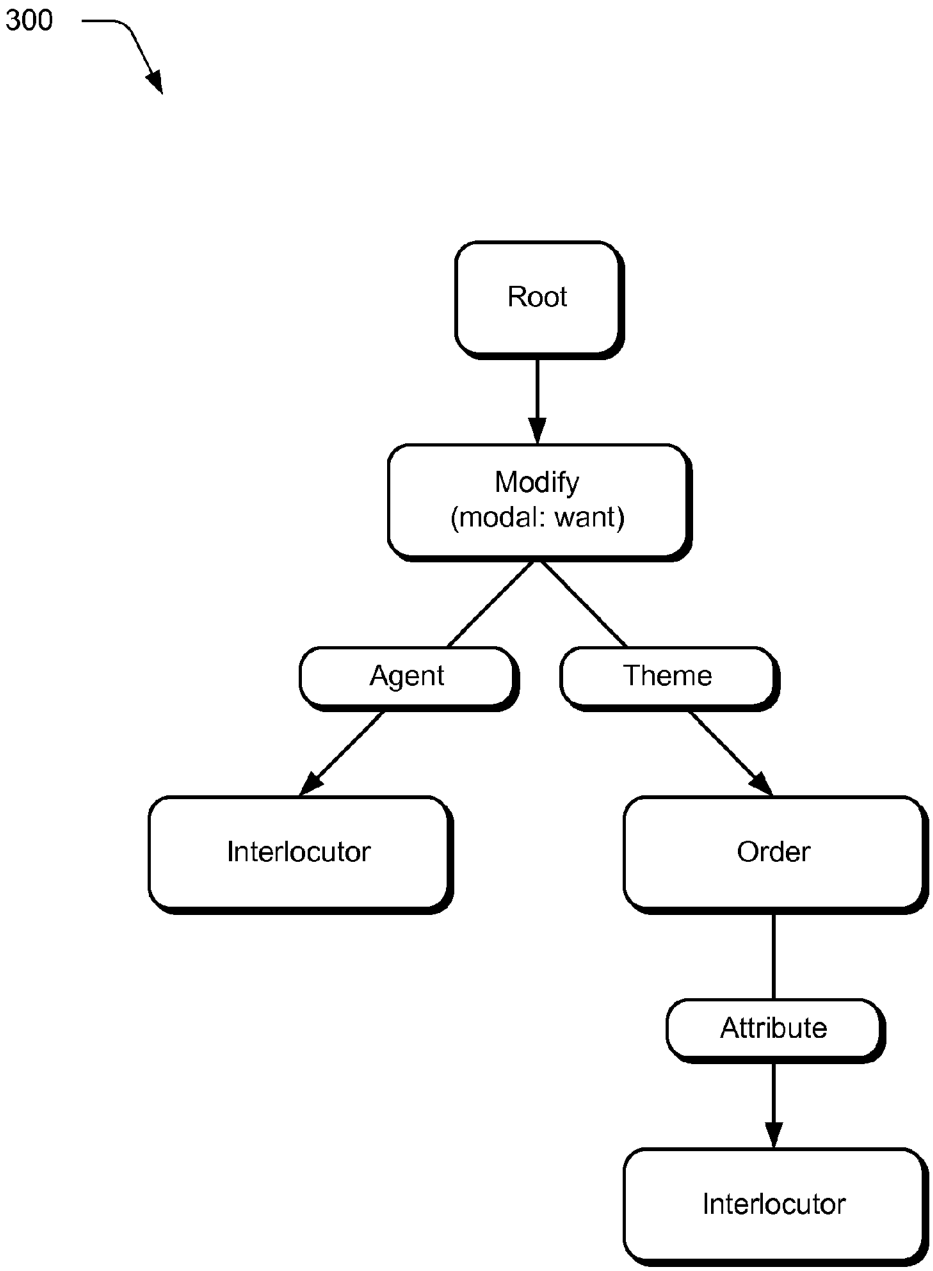
FIG. 3 is an illustration of an example semantic graph that is generated by a conversational agent of FIG. 1 for a user utterance.

FIG. 3 is an illustration of an example semantic graph 300 that is generated by the conversational agent 104 of FIG. 1 for a user utterance. Text from a user's utterance (e.g., spoken, written, and so on) may be parsed into a semantic graph 300. The nodes of the semantic graph 300 represent concepts; the directed edges are labeled with semantic functions in the figure. Together, concepts related to nodes and semantic functions related to edges will be called semantic concepts or traits (and may also be referred to as attributes, properties, features, and so on). For example, the sentence "I'd like to change my order" may be parsed into the semantic graph 300 shown in FIG. 3.

The main trait of a node is the concept it represents. In an implementation, concept traits (e.g., "modify" in FIG. 3) are abstracted over lexical variations and spelling mistakes. For example, replacing the word "change" by "alter," "modify," or even "moddify" (sic) in the user input does not affect the structure of the semantic graph 300 shown in FIG. 3. Likewise, representing "my" and "I" by the concept Interlocutor makes the interpretation of the semantic form insensitive to the form used in the user utterance. For example, the utterance "You would like to modify your order" may be parsed by the linguistic analysis module 116 to form the graph 300 shown in FIG. 3. Similarly, "We would like to change our order" may also be parsed by the linguistic analysis module 116 into the graph 300 shown in FIG. 3.

In implementations, constructions such as "would like to" are represented by a modal trait on the modify node and not a concept trait. Additionally, this particular value may be present on one or more of the utterances "I'd like to", "I want to", "I wanna", and so on. In this way, a single representation may be provided for a variety of synonymous constructions. On the other hand, use of a dedicated modal trait rather than creating a node with a "want-to" concept trait may help to simplify the semantic graphs and thus facilitate pattern matching, further discussion of which may be found later in the "Pattern Matching" section of the description.

The graph edges that are drawn in FIG. 3 may be referred to as "function edges" with the respective labels representing semantic roles. For example, in FIG. 3 Order is the theme of Modify, i.e., the object acted upon. In FIG. 3, this is denoted by the Theme label on the edges between the two nodes, denoting the "theme" semantic role. The Theme label may still fulfill this role even if the same relation were expressed in the passive, e.g., "Has my order been modified?" where "order" is a syntactic subject. Thus, semantic abstraction may be used to provide a straightforward identification of common ideas in different utterances, which may increase the efficiency and accuracy of a pattern matching process to be discussed later.

In the semantic graph 300, function edges and their incident nodes form a tree. In implementations, the root of the tree may be used as a placeholder that does not represent a particular concept of the utterance. For example, the concept trait may be set to a value "Top," which is representative of the most general concept.

It should be noted that parsing may focus on extracting dependencies between words, which may then be mapped to dependencies between concepts. This approach, known generically as a dependency grammar, does not make assumptions on phrase structure. Therefore, incomplete sentences and ungrammatical sentences may be handled and mapped to a semantic graph, much in the way a human may extract meaning from ungrammatical or incomplete sentences. This approach allows a conversational agent to be robust and able to understand "real" user utterances, which are often grammatically incorrect, may contain typos and spelling mistakes, and may use slang words or phrases.

Example Linguistic Analysis

Figure 4:
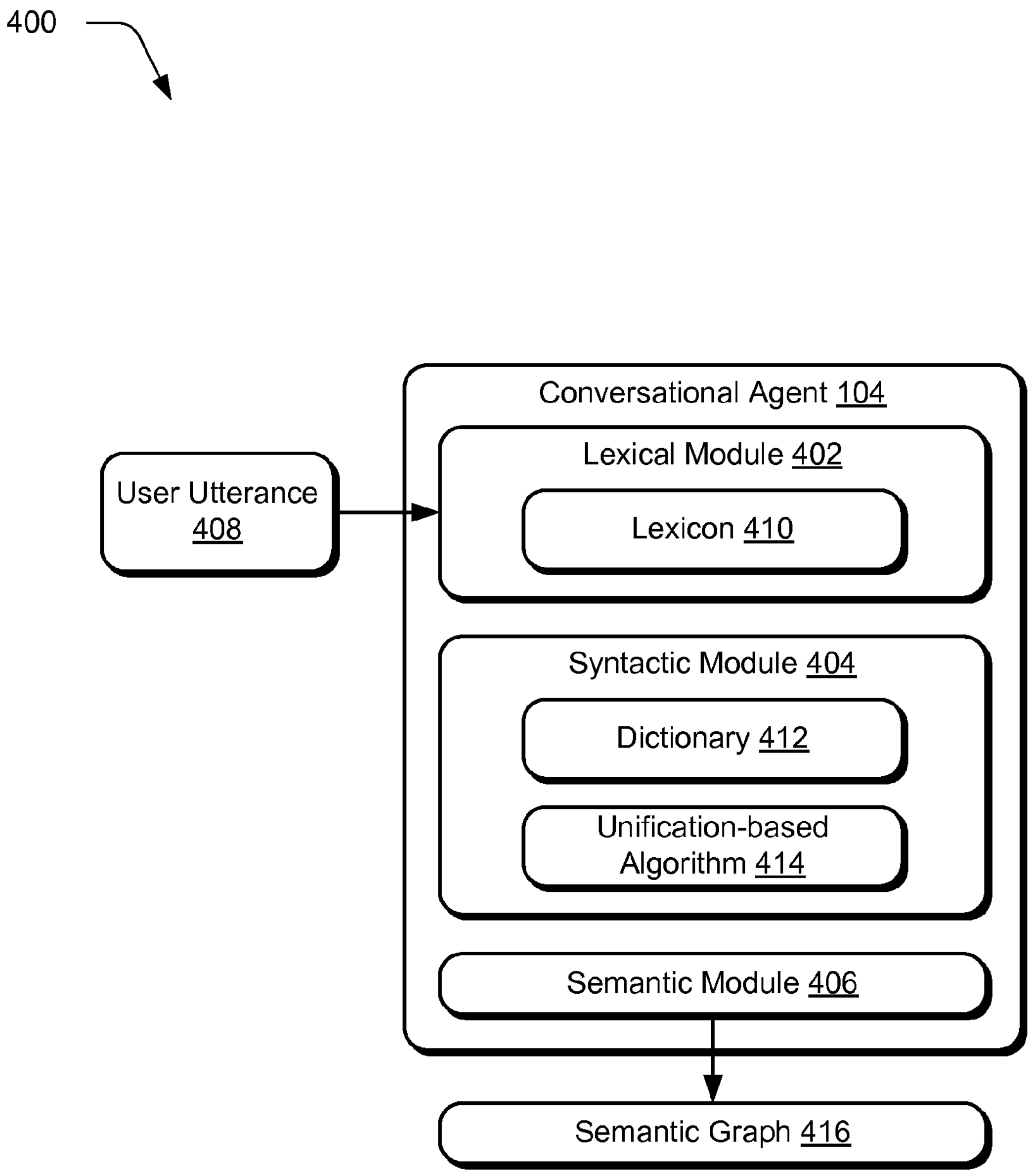
FIG. 4 depicts an example implementation of a system for performing linguistic analysis of a user utterance.

FIG. 4 depicts an example implementation of a system 400 for parsing (or analyzing) a user utterance. The system 400 of FIG. 4 illustrates a conversational agent 104 as being portioned into a lexical module 402, a syntactic module 404, and a semantic module 406 which are representative of functionality that may be employed at different levels in the parsing procedure. At the lexical module 402 level, a user utterance 408 (e.g., a sentence) is segmented into words and each word is matched against entries in a lexicon 410 with the aid of a spell checker.

Because there may be a variety of spelling suggestions for a word, and a lexical entry may include several words (for example "credit card" or "bill of sale"), the lexical module 402 of the conversational agent 104 may map a word sequence of the user utterance 408 to one or more flexion sequences. A flexion is a lexical entry that includes a lemma (i.e., an uninflected form) and possibly grammatical marks, such as tense, number, person, mood, and so on. For example, the lemma "agent" may have the flexions that include "agent" and "agents."

In an implementation, the lexicon 410 that is used to match words to flexions is language-dependent. Additionally, some of the entries contained therein may be specific to a business area, a conversational agent, and so on. For example, lexical entries may include names of forms specific to a business area or commercial names specific to the conversational agent 104. Accordingly, lexicon 410 lookup may be filtered by word spaces, where a word space characterizes a conversational agent or a business area.

At the syntactic module 404 level, information that is common to the flexions of a given lemma is stored in a dictionary 412. This information may include (1) construction information and (2) ontology information. Ontology information pertains to the semantic level; and provides the concept traits which are further mentioned in the "Parsing and semantic representations of input sentences" Section and FIG. 3. Construction information includes possible part-of-speech assignments to a lemma. For example, "format" may be assigned both verb and noun constructions. Construction information may also include syntactic patterns linking the dictionary item to other items. For example, the construction for "format" as a verb may show that the item relates to a noun with a subject link and to another noun with an object link.

A unification-based algorithm 414 may be employed to unify available constructions of the lemmata (i.e., a plurality of lemma) in a sequence to yield one or more syntactic graphs. In addition to part-of-speech information, linearity information (e.g., in English, a tendency of objects to occur after verbs) and the confidence assigned to the recognition of particular constructions may be taken into account to score the graphs.

At the semantic module 406 level, a highest-scoring syntactic graph is mapped to a semantic graph 416. As a result of this process, a semantic graph 416 having increased abstraction is obtained in which nodes represent ontology concepts and edges represent logical relations between the concepts.

Figure 5:
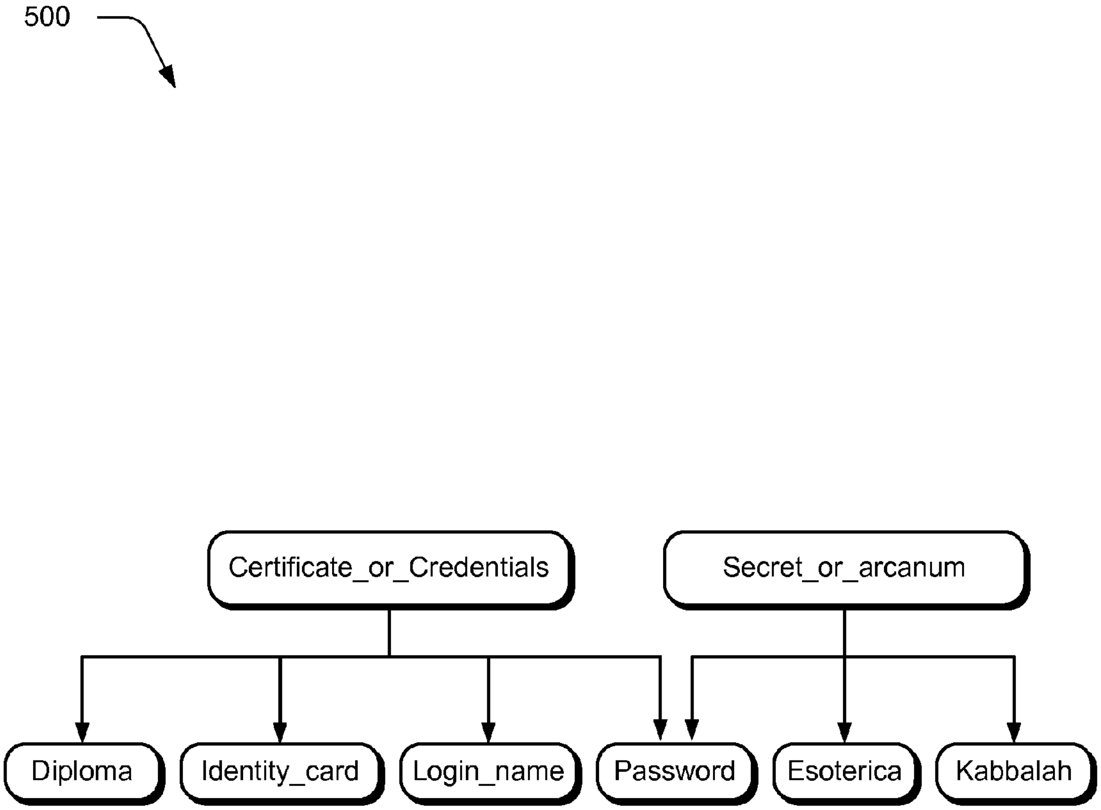
FIG. 5 depicts an example implementation of an ontology using a language-independent hierarchy.

Ontology may be represented as a language-independent concept hierarchy. This hierarchy may be represented using a directed graph with two types of edges, "is-a-kind-of" and "subsumes." In the example 500 shown in FIG. 5, for instance, a "password" is a kind of "certificate_or_credentials" and is a kind of "secret_or_arcanum". In turn, "secret_or_arcanum" also subsumes "esoterica" and "kabbalah", while "certificate_or_credentials" subsumes "login_name", "identity_card", and "diploma".

Representation of Intents by Graph Patterns

For illustration purposes, suppose the conversational agent 104 has been designed to help users change their password on the web site that embeds the conversational agent's user experience 112. A user may express this request in a variety of ways. Consider, for example, the user utterances: "How does one change one's password?", "How to change password," "How should I go about changing my password," "Need to change my password. How do I do that?", and "Would you be so kind as to tell me how to modify my password?" Each of these wordings contain the concepts "how" and "change password," with substantial variation in the exact way these two concepts are linked to each other, as well as in the use or omission of pronouns.

Figure 6:
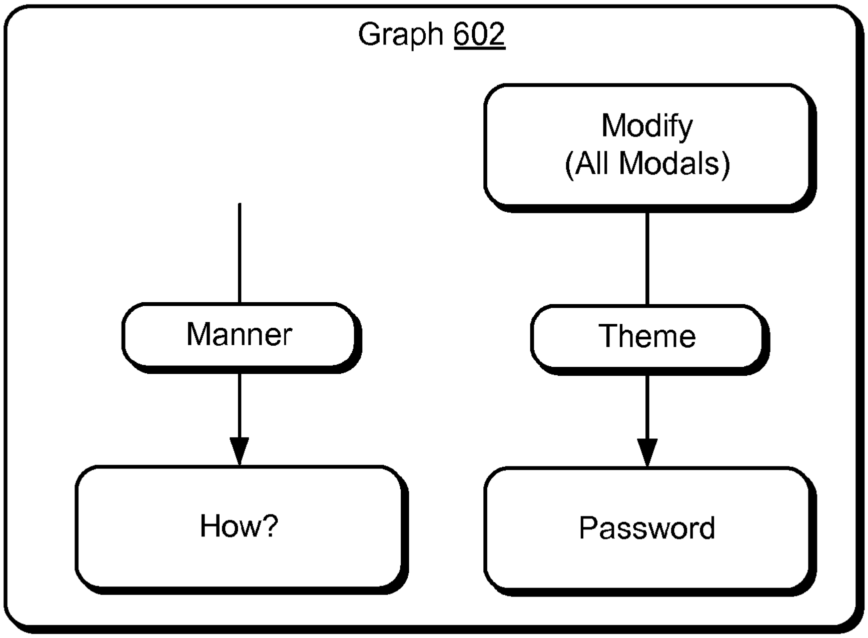
FIG. 6 depicts an example implementation of a semantic graph pattern that includes graph fragments.

One way to capture an intent common to these utterances is through use of semantic representations that contain graph fragments. FIG. 6 depicts an example implementation 600 of a graph pattern 602 that includes graph fragments for (1)

"change password" (with "password" functioning as the theme of "change"); and (2) "how". These fragments form a graph pattern (which, for purposes of the discussion that follows, may be simply referred to as a "pattern"). An utterance is considered as matching this pattern if each of the pattern fragments occurs in a semantic graph of the utterance. It should be noted that this is a condition that is considered sufficient for matching; further discussion of this and other conditions may be found in relation to the following section.

Figure 7:
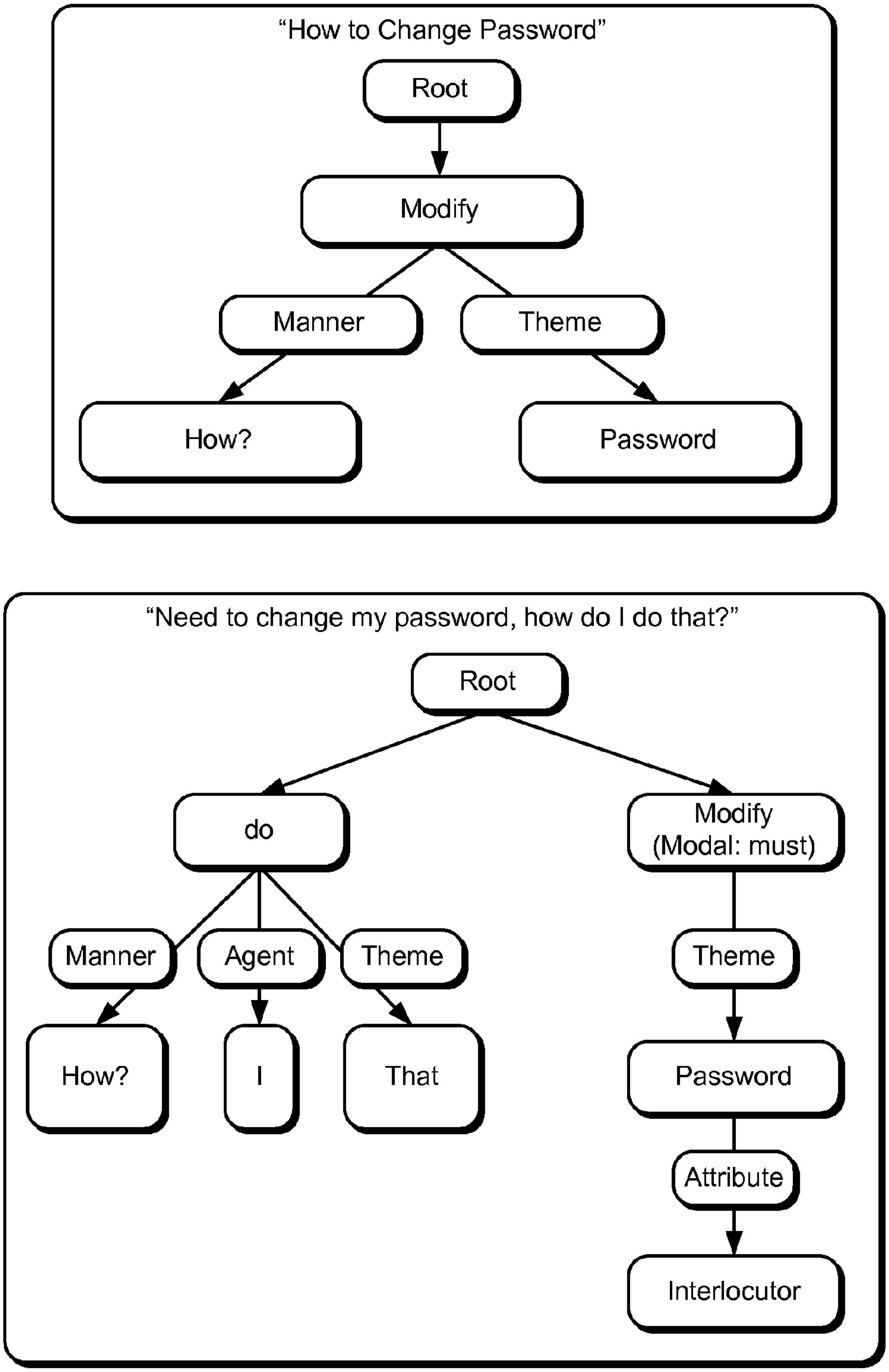
FIG. 7 is an illustration of an example implementation showing examples of semantic graphs corresponding to utterances that match the two fragment graphs making up the graph pattern of FIG. 6.

For example, semantic graphs for "how to change password" and "need to change my password. How do I do that?" both contain these fragments, examples of which are illustrated in the implementation 700 of FIG. 7. In this implementation 700, examples of semantic graphs that match the two graph fragments 602 of FIG. 6 are shown.

Trait Matching

Suppose the conversational agent 104 has been created to explain how to change credentials (i.e., user ID and/or password) rather than a password, specifically. Accordingly, a pattern may be defined to match questions about how to change one's password as well as a user ID or other credentials. This is an example of a situation in which information to be provided by the conversational agent 104 may be described by a general concept that subsumes a number of more specific concepts that are likely to occur in user utterances. For example, the conversational agent 104 may deliver generic information about connecting an Internet router, but requests for this information are likely to mention specific router brands and models.

Concept subsumption may provide flexibility to the conversational agent 104. In implementations, the conditions that are to be met for a match to be considered between a semantic graph and a pattern are stated as follows: A pattern matches a semantic graph if and only if a subgraph of the semantic graph subsumes the pattern. Continuing with the previous example, a simple example of graph subsumption would be the semantic graph for "change credentials" as subsuming the graph for "change password," an example of which is shown in the implementation 800 of FIG. 8.

Figure 8:
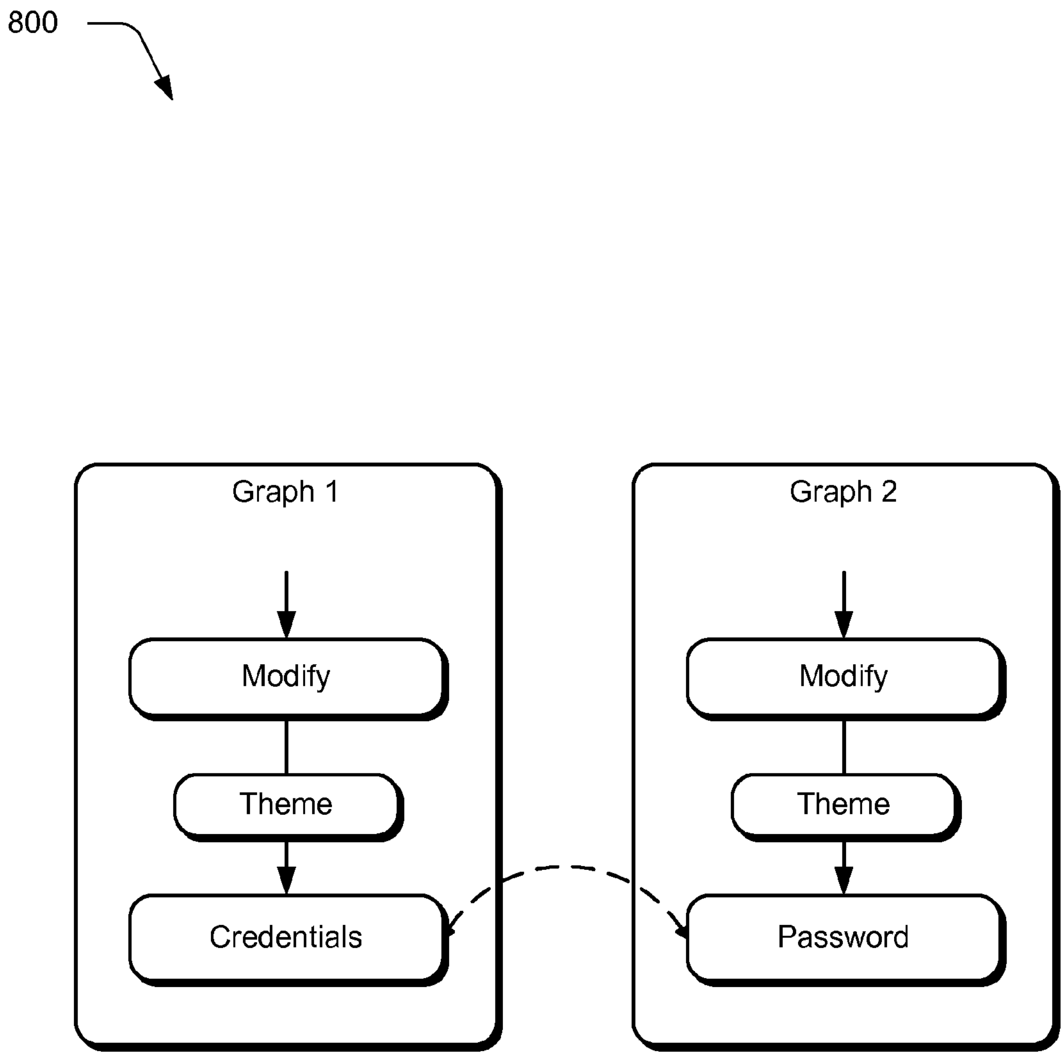
FIG. 8 is an illustration of an example implementation of subsuming graphs.

In FIG. 8, given that ontology defines "password" as a child of "credentials" as previously discussed in relation to FIG. 4, Graph 1 subsumes Graph 2 in this implementation 800. More generally, a graph g1 subsumes a graph g2 if and only if g2 can be transformed into g1 by zero or more applications of the following operations:

- Delete a node and its incoming edge from g2;
- Delete a trait from a g2 node; or.
- Replace the value of a trait in g2 by another value that subsumes it.

Trait subsumption has been illustrated in FIG. 8 for concept traits. However, it should be noted that trait subsumption may be defined on a variety of traits, including function labels on edges. Here are other examples:

- The modal value "MAY or MUST" subsumes the value "MUST".
- The generic edge label "Attribute" subsumes each other edge label (for example, "Agent," "Theme," "Location," etc.).

Subsumption for modal values is based on sets of possible values. Either a trait takes its value in a hierarchy (e.g., edge labels, ontology concepts) or in a collection of sets. For example, the modal value "MUST" is really a singleton set that includes a single instance of "MUST."

Representation of an Intent by a Set of Graph Patterns

In addition to capturing stylistic variations on a question, matching also helps capture logically distinct but equivalent ways of expressing the same intent. For example, a user might ask how she can change her password by typing, "How can I change my password?" or by typing, "Can you help me change my password?" Therefore, a single intent is not usually captured by a single graph pattern. Accordingly, several graph patterns may be used. This set of patterns forms a logical disjunction, meaning that, in order to match the intent, a user utterance matches at least one of the patterns.

Matching Algorithm Example

A set of possible intents may be associated with each position in a conversational agent's 104 decision tree 120. This set is the union of the intents of the child nodes at that position in the decision tree 120. Each of the possible intents at the current decision tree 120 position is represented by a set of graph patterns. The set of patterns collectively representing each of the possible intents at a current position are referred to as the active patterns in the following discussion.

Matching Algorithm Outline Example

Given an utterance and a current position in the conversational agent's 104 decision tree 120, the conversational agent 104 may perform the following steps to determine user intent:

1. Retrieve the active patterns at a current position.
2. Match each active pattern against the semantic graph of the utterance.
3. Assign a matching distance to each successful match between the semantic graph of the utterance and an active pattern.
4. Select the intent represented by the active pattern with the smallest matching distance.

If no successful match can be found in step 2 above, we say that the utterance is unmatched. In such a case, the conversational agent may not have the linguistic knowledge to assign an intent to this utterance.

Matching Distance

A number of metrics may be used to measure a distance between a graph of an utterance and a matching graph pattern in the conversational agent's knowledge. These metrics may combine one or more of the following quantities algebraically:

1. The amount of information contained in matching pairs of trait values.
2. The semantic distance between the trait values in a matching pair.
3. The amount of information contained in sentence nodes and edges outside the matching subgraph.

In implementations, a metric formula is used to compute a distance that decreases with quantity 1 and increases with quantities 2 and 3. These constraints correspond to the semantic "closeness" of the semantic graph and the pattern it matches.

The amount of information in trait values may be measured in a number of ways:

- In one such approach, a node's traits collectively count as a constant (typically equal to 1). Therefore, quantity 1 does not vary for a given pattern and quantity 3 is simply a number of nodes that are not involved in the match.
- Other such approaches may use a specificity metric. For example, trait values may be considered to have increasing specificity as the number of occurrences in utterances decreases. This may be captured by computing an inverse of a proportion of utterances containing a given trait value. This measure may also be referred to as inverse frequency.

The matching distance between two trait values (quantity 2, henceforth called subsumption distance) may be computed as a function of:

Characteristics of a shortest path from one concept to another in a concept hierarchy; and Proper containment or equality for subset subsumption (as, for example, with modal trait values).

In various implementations, the number of graph nodes is used as a measure of information and the trait distance is proportional to the number of hierarchy levels linking two concepts or two edge labels.

Indirect Patterns

The conversational agent 104 may also leverage indirect patterns that are assigned low confidence and may be used in cases when the conversational agent 104 is not "sure" of the user's intent. Exclusive, or direct, patterns may take precedence over non-exclusive, or indirect, patterns when identifying a user's intent by the conversational agent 104. If the user's utterance does not match one or more direct patterns, each indirectly matching intent may be considered as potentially relevant. The conversational agent 104 may then offer the user a list of question rewordings or a list of potentially relevant topics or questions. This may occur when a user has entered several keywords but not a full sentence or phrase that more fully describes what is being requested.

For example, a user may type "cashback" which might mean "How does cashback work?" or "I never received my cash back." A designer of the conversational agent 104 may address this situation in a variety of ways, examples of which include the following:

1. Define a "cashback" intent (with an associated direct pattern) that elicits a question from the agent to determine whether the user is attempting to solve an issue or is merely inquiring about cashback.
2. Attach an indirect pattern for "cashback" to both intents.

The first method may be useful in specific situations for conversational agents where several keywords or ideas are used throughout by the agent in a wide variety of contexts. Therefore, more precise information is to be gathered to differentiate between them. The second method (that relies on indirect patterns) makes it possible to deal with intent ambiguity with minimal demands on designer time.

Visual Display of Pattern Information

As previously described, identification of patterns that are matched to a too-broad, too-specific, or incorrect group of utterances may be used to improve a conversational agent. For example, a pattern that is too specific will fail to match utterances to the correct intent whereas a pattern that is too general may result in an agent intent being activated in response to utterances that should not trigger that intent. Traditional techniques that were employed to evaluate whether a correct match was generated, however, generally did not take into account the range of utterances that a user may submit to the conversational agent because they were based on best practices rather than data-driven. In the following discussion, techniques are described in which a pattern's correctness may be judged by viewing which utterances are actually matched to the pattern.

Additionally, traditional techniques that employed a matching system dependent on extensive knowledge of linguistics and semantic graphs to build and improve a conversational agent may be limited in terms of their ability to scale. Even for a trained reviewer, for example, it may be difficult to determine that a semantic graph will match appropriate utterances and not others. Using the visual representation techniques described herein, however, a reviewer who understands the conversational agent's business rules may detect patterns that do not behave as expected without an extensive knowledge of linguistics. Therefore, a pattern that is not functioning as intended may be removed, moved, fixed, and so on by a wider range of reviewers.

Further, it may be difficult to understand why an utterance matched to a specific pattern in instances in which the mapping between semantic graphs and graph patterns cannot be easily understood. In one or more implementations, the visualization techniques described herein may be used to visually indicate which parts of an utterance matched a pattern. This indication may therefore make it easier to understand why a pattern is matched to unexpected utterances.

Yet further, when a pattern is added to a conversational agent, it may be difficult to determine whether that pattern could be erroneously matched to utterances. In implementations, visual representations that are based on real user utterances are utilized to show the effect of each particular pattern.

Users also generally expect that a conversational agent will address most if not all of the user's inputs when providing answers during a conversation. Therefore, evaluation of whether a specific utterance triggered the correct agent intent may involve review of a conversation that includes the utterance. Information gained in this manner may be used to improve a pattern, remove or alter the pattern if it is determined that the utterances should not trigger this agent intent, and so on. Further discussion of these techniques may be found in relation to the following sections.

Specificity Metrics

Use of inverse frequency as a specificity metric generally provides a sufficient approximation to measure the specificity of a concept, i.e., its ability to characterize a specific topic. However, topic selectivity may be measured in a more direct way, namely by comparing a unigram distribution of concepts in a corpus with a conditional distribution of terms in utterances containing the concept to measure. For example, a neutral concept like "interlocutor" typically occurs in a subcorpus whose concept distribution does not essentially differ from the distribution of terms in the whole corpus. Conversely, a specialized concept like "spark plug" typically occurs in utterances forming an automotive subcorpus, meaning that in this subcorpus automotive terms will be overrepresented and terms representative of other specialized topics (e.g., cooking or finance) are underrepresented with respect to the overall corpus. A variety of heuristics may be used to perform such a comparison between distributions, examples of which include vector-space sine and the Kullback-Leibler divergence.

Collecting User Utterances from Conversations

Figure 9:
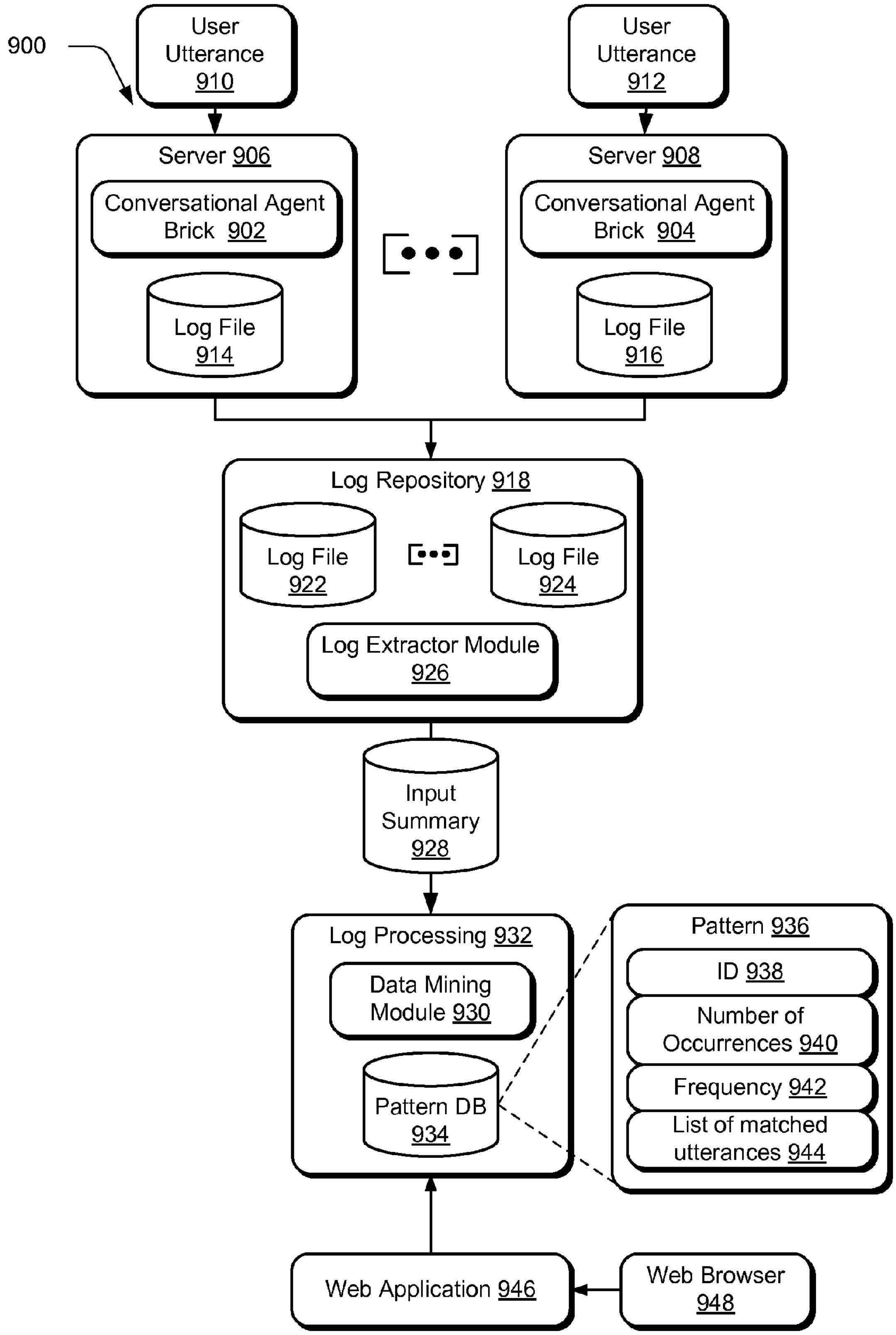
FIG. 9 is an illustration of an example system in which a pattern database is populated using logs of conversations, and the pattern database is accessible via a web application.

As shown in an example implementation of a conversational agent system 900 in FIG. 9, conversational agent bricks 902, 904 are illustrated as modules implemented via respective servers 906, 908. The conversational agent bricks 902, 904 process user utterances 910, 912 by parsing the user utterance, matching it to one or more patterns to determine the intent, and applying logic that corresponds to that intent in order to generate an answer as previously described.

During the course of processing the user utterances 910, 912, a variety of different types of information may be logged by the conversational agent bricks 902, 904 to a respective log file 914, 916. For example, the logged information may include information about which direct or indirect pattern was activated as a result of the matching process for a user utterance, a mapping between nodes of the pattern and the words of the user utterance that are captured, and so on. Thus the mapping may be produced by the conversational agent bricks 902, 904 during a matching process and data that describes this mapping may be included in the log files 914, 916.

In the illustrated example of FIG. 9, data from the log files 914, 916 is communicated to a log repository 918 and illustrated as communicated log files 920, 922. Thus, the log repository 918 may act as a central collection point for the log files from the conversational agents 902, 904.

A log extractor module 926 is also illustrated as included on the log repository 918. The log extractor module 926 is representative of functionality to process the log files 922, 924 and extract the information pertaining to the parsing and matching of user utterances, which may be summarized in an input summary 928.

The input summary 928 generated by the log extractor module 926 may be periodically processed by a data mining module 930, which is illustrated as part of a log processing 932 service. For example, the data mining module 930 may update information in a pattern database 934, such as a number of activations for each pattern contained in a conversational agent, as well as a list of one or more sample user utterances that led to that pattern's activation.

In one or more implementations, the pattern database 934 includes the following information for each pattern 936:

- The unique identifier (ID) 938 of the pattern;
- The number of occurrences 940 of the pattern over a given time interval;
- Pattern activation frequency 942 information; and
- A list of matched utterances 944 of one or more users, each containing information about a sample user utterance:
  - the user utterance that caused the pattern to be activated;
  - the list of the matched words in the user utterance, These words are directly taken from the matching mapping mentioned above;
  - a unique identifier of the conversation during which the user utterance occurred;
  - a date of the conversation; and
  - the specificity of the user utterance, computed as described above.

The system 900 is also illustrated as including a web application 946 that is configured to allow a reviewer to use a web browser 948 to display the information in the pattern database 934. Naturally, other examples are also contemplated without departing from the spirit and scope thereof.

The list of matched utterances 944 (e.g., also referred to as input sentences in the following example but other utterances are also contemplated such as words, abbreviations, and so on) may contain each user utterance encountered over a given time interval or a subset thereof. For a conversational agent that processes a large volume of conversations, for instance, the list of matched utterances 944 may contain a subset of the user utterances in order to reduce the amount of memory consumed by the pattern database 934.

The utterances included in the subset may be chosen to represent which intent is captured by the pattern. For example, the data mining module 930 may keep user utterances 910, 912 that contain a minimum amount of information based on a specificity metric that was computed earlier when mining the data by the data mining module 930. This metric is computed based on each of the concepts found in the user utterances 910, 912 sent to the conversational agent bricks 902, 904 and associates a score to each concept. This score represents the specificity of a concept in the given context of the conversational agent, as described above.

As the data mining module 930 may perform the data mining periodically in an implementation, a list of matched utterances 944 containing a subset of user utterances may already exist in the pattern database 934 when the data mining module updates the data associated to a given pattern 936. Accordingly, when the data mining module 930 processes an entry in the input summary file 928 corresponding to a specific pattern $p_0$ and user utterance $i_0$, the data mining module 930 may update the list of matched user utterances 944 for $p_0$ and select which user utterances will be kept in the subset. The following steps may be performed:

- If $i_0$ is already contained in the current list of matched user utterances 944 for $p_0$, then the date and unique identifier of the conversation in the current list of matched user utterances 944 are updated to reflect the most recent date. Processing then continues for the next entry in the input summary 928.
- Each of the sentences in the current list of matched user utterances 944 (the subset of user utterances that is already stored in the pattern database 934) is removed that is older than a threshold amount of time, e.g., "N" days. In this example, N is configurable for a given conversational agent in the data mining process; a typical value is N=30 days.
- Next, compute the specificity $s_0$=specificity ($i_0$). The specificity of a sentence is obtained by summing the specificities of each of the concepts found in the sentence as described above.
- The user utterance $i_0$ is added to the list of matched user utterances 944 $\{i_1, \ldots, i_n\}$ and the resulting set $\{i_0, i_1, \ldots, i_n\}$ is ordered by increasing specificity. The ordered resulting set may be designated as $\{i'_0, i'_1, \ldots, i'_n\}$, where $s_0 \leq \ldots \leq s_i \leq \ldots \leq s_n$.
- The ordered resulting set may be truncated by keeping, at most, the first K members, i.e., $\{i'_0, i'_1, \ldots, i'_m\}$ where $m \leq K$. Thus, K represents a maximum number of user utterances to be kept in list of matched user utterances 944 to represent a subset of the matched user utterances.
- The old list of matched user utterances 944 in the pattern database 934 is then replaced by the set $\{i'_0, i'_1, \ldots, i'_m\}$.

Viewing Pattern Information

In an implementation, by using a web browser 948 connected to the web application 946 shown in FIG. 9, a reviewer can see which sentences have been captured by a given pattern 936. For example, the web application 946 may use the information in the pattern database 934 to retrieve the list of matched user utterances 944 associated to the given pattern 936. The matched words of each user utterance may be indicated (e.g., highlighted) to help the reviewer to understand why the user utterances resulted in the activation of the pattern, examples of which may be found in the discussion below.

Further, using the techniques described herein a reviewer may gain additional context about an input sentence, e.g., to better understand either the behavior of the agent or what the user really meant. To do so, for each user utterance displayed for a pattern, the web application 946 may allow the reviewer to navigate to a page that displays the entire conversation in which the utterance occurred. In an implementation, the web application 946 uses the unique identifier of the conversation (which is stored in the pattern database 946 as previously described) to navigate to the conversation reading page of a web analytics application to display this conversation as further detailed below.

Figure 10:
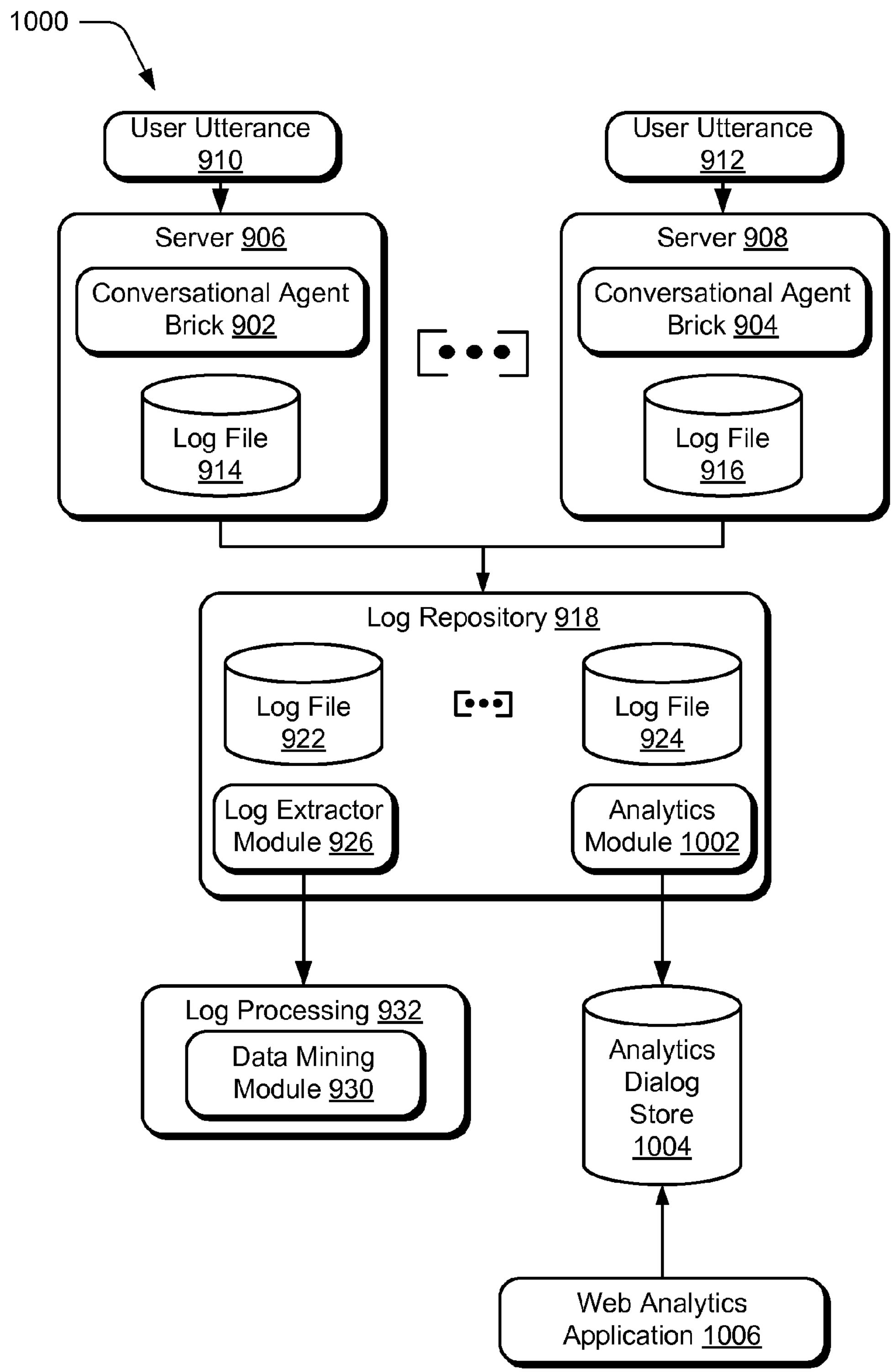
FIG. 10 is an illustration of an example system in which a pattern database is populated using logs of conversations, and the example system also includes an analytics pipeline to populate an analytics store.

As shown in FIG. 10, the communicated log files 922, 924 generated by the conversational agent bricks 902, 904 are also processed by an analytics pipeline. In the analytics pipeline, each of the conversations are extracted from the logs by an analytics module 1002 and stored into a database called an analytics dialog store 1004. In this database 1004, the conversations are indexed according to their conversation identifier, which is taken from the logs and, consequently, is the same as the one used in the data mining pipeline described in relation to FIG. 9. The analytics dialog store 1004 is illustrated as being accessible by a web analytics application 1006, which in an implementation may also be accessed by a reviewer using a browser as previously described.

Identifying Missing Words

A conversational agent 104 may not understand some of the words employed by a user in one or more user utterances. For example, the conversational agent 104 may be unable to find in its lexicon 410 the word as it is spelled during lexical parsing of an input. In this case, the conversational agent 104 may employ spell checking functionality to produce suggestions for alternative spellings. For instance, a spell checker may be able to produce an alternate spelling that is contained in the conversational agent's 104 lexicon 410, such as in an instance in which the user made a spelling mistake.

However, in some cases the conversational agent's lexicon 410 may lack a specific word. For instance, the lexicon 410 may not contain an entry for the word "bump". If the word is significant in the context of the conversational agent 104 (for instance it is a brand or product name, or a term used to describe a specific condition), this lack may be indicated to a reviewer so that the missing word can be eventually added to the conversational agent's lexicon 410. Further, techniques may be employed to prioritize the missing words that have been detected. Therefore, a reviewer may focus on the words that have at least a certain amount of impact on the comprehension of the agent, e.g., occur in a large number of user utterances.

Figure 11:
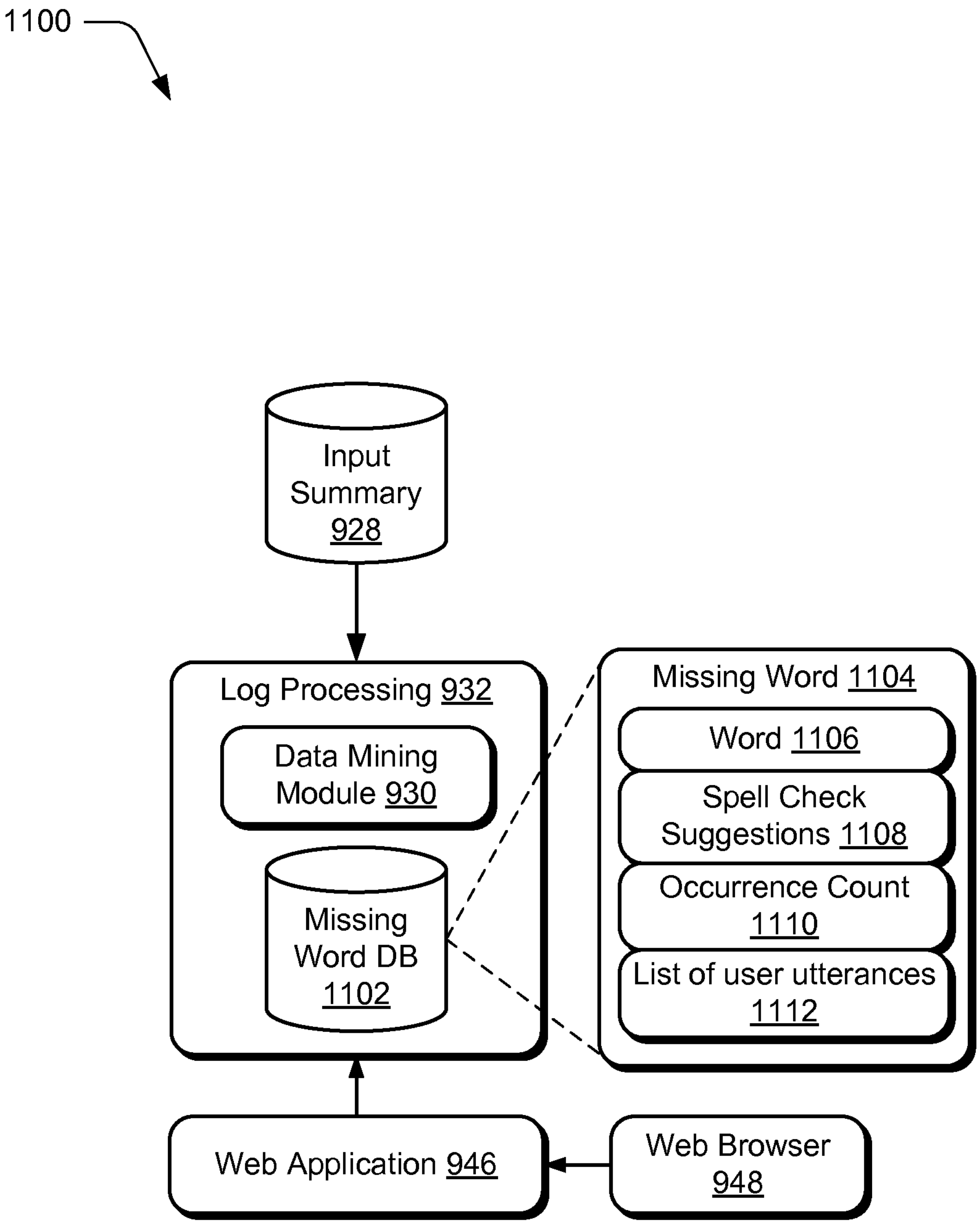
FIG. 11 is an illustration of an example system in which a missing words database is populated using logs of conversations.

To detect the missing words, the data mining module 930 described in relation to FIG. 9 may collect input sentences from conversations and perform an additional function as shown in the example system 1100 of FIG. 11. The data mining module 930 extracts user utterances $i_k$ from the input summary 928 and performs a lexical parse on the user utterances $i_k$. As described previously, this lexical parse may map the word sequence to one or more flexion sequences. In the flexion, in addition to the lemma and grammatical marks, the parse adds the information provided by the spell checker if the latter was activated.

Using the parse results, the data mining module 930 extracts the words that do not have an entry in the lexicon 410 and updates a missing word database 1102. Each entry for a missing word 1104 in this database 1102 may contain the following information:

- The missing word 1106 with the exact spelling used in the user utterances where it occurs.
- Possible spell checker suggestions 1108 (if provided by a spell checker for this word).
- A count of occurrences 1110 for the missing word 1104 in the input summary files 928.
- A list of user utterances 1112 that contain the missing word.

At this stage, the missing words database 1102 contains information about which words are unknown in the lexicon 410 and possible suggestions provided by the spell checker, if any, for the missing words. By a similar process as the one used to associate user utterances to patterns as described in the collecting user utterances from conversations section above, a subset of user utterances may be kept as the list of user utterances 1112 to illustrate the user utterances where the missing word was found. For each missing word, a count of occurrences 1110 may be maintained to help the reviewer gauge how important it may be to add the missing word to the lexicon.

Additionally, the data mining module 930 may also periodically check that each of the missing words 1104 currently stored in the missing words database 1102 are still missing, i.e. have not been added to the agent lexicon 410 yet. In an implementation, if a missing word 1104 has been added (and thus is no longer "missing"), the missing word 1104 is not removed from the missing words database 1102 but is marked as "recently added". This attribute is used to suppress display of the added missing words using the web application 946, even if further input summary files 928 are processed that were generated by a version of the conversational agent bricks 902, 904 that does not yet reflect the lexicon update.

Display of Patterns in a User Interface

As previously described, direct manipulation of graph patterns is generally not practical for a broad group of reviewers. By using the techniques described herein, however, patterns can be manipulated by a wide variety of reviewers through use of a representation based on user utterances that matched to that pattern. Examples of which representations are described in the following sections.

Minimized Representation of Patterns

Figure 12:
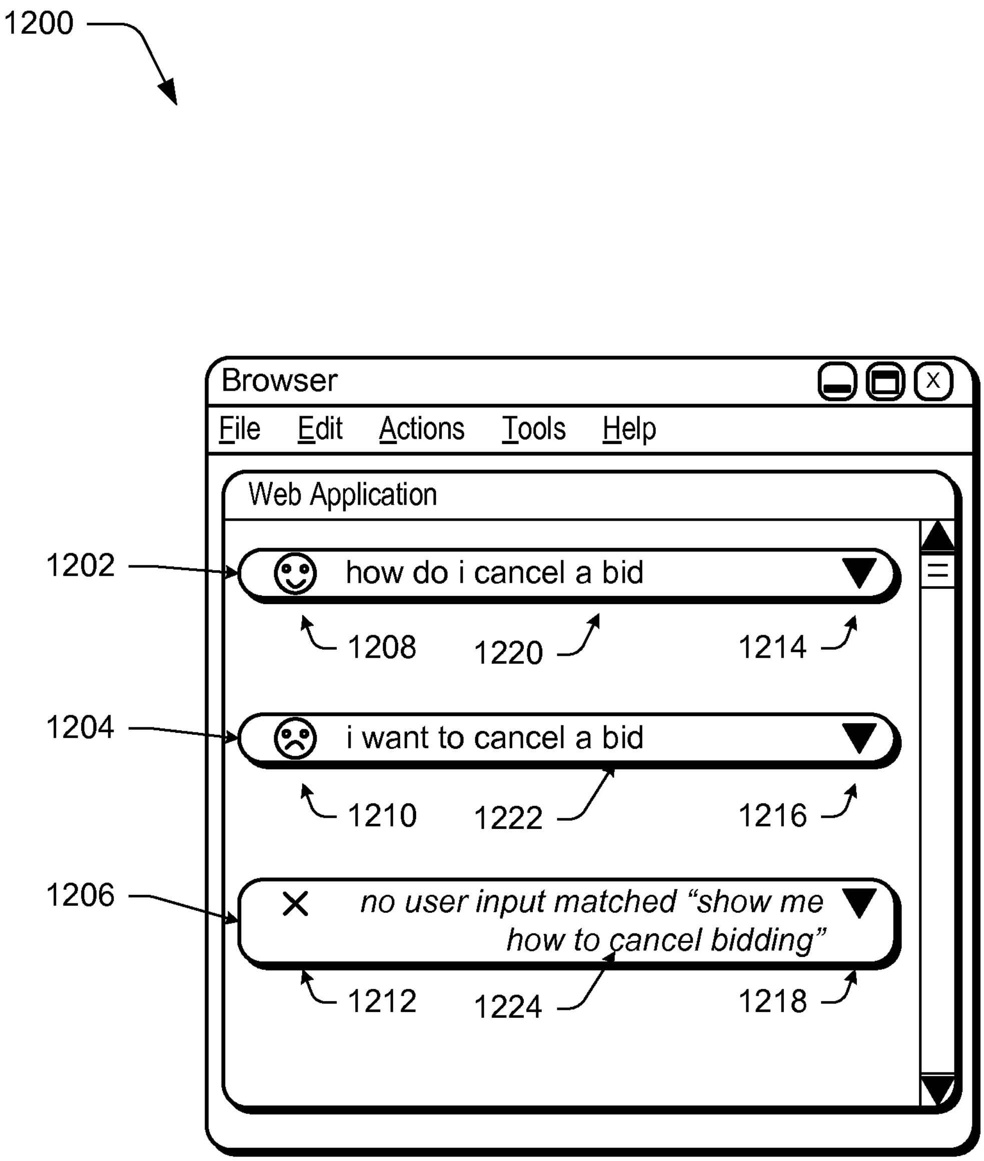
FIG. 12 is an illustration of an example user interface showing a minimized representation of a pattern of an intent using a single user utterance, which in this instance is a sentence.
Figure 13:
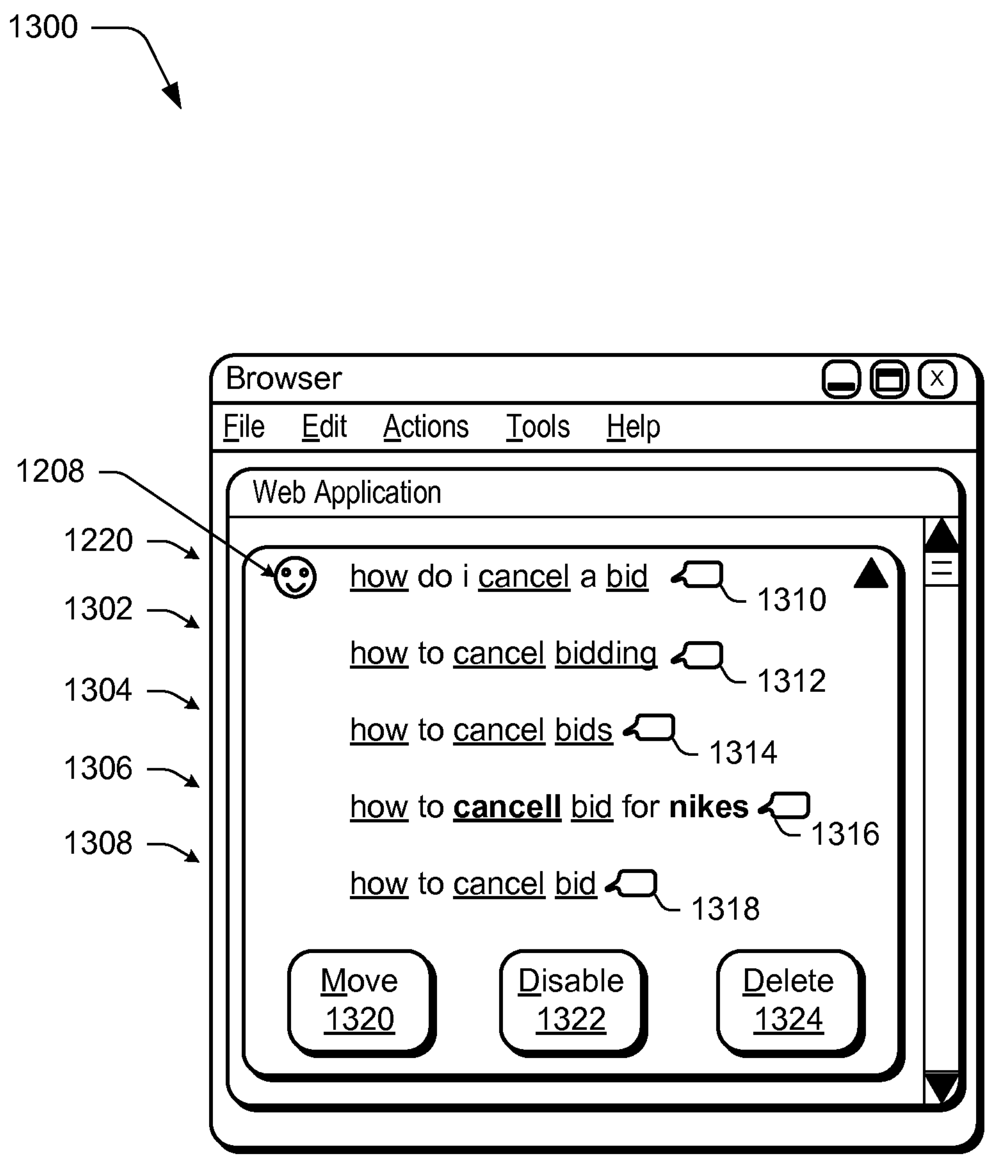
FIG. 13 is an illustration of an example user interface showing a maximized representation of a pattern of an intent displayed in response to selection of a control included in the minimized representation of FIG. 12.

As shown in an example user interface 1200 of FIG. 12, a minimized representation may be used to show a single sample user utterance that is matched to a corresponding pattern and the pattern's popularity (or status). Examples of this are illustrated for patterns 1202, 1204, 1206 using first, second, and third user utterances 1220, 1222, 1224 in the user interface 1200. For example, a pattern 1202 can be popular 1208, a pattern 1204 may be unpopular 1210, or a pattern 1206 may be unused 1212. The minimized representation may also have a respective control 1214, 1216, 1218 to expand the respective representation 1202, 1204, 1206 to a maximized representation, an example of which is shown in FIG. 13.

When the web application 946 of FIG. 9 is used to display patterns using the minimized representation, it may use information stored in the pattern database 934 as follows:

- The popularity 1208, 1210, 1212 is based on pattern activation frequency 942.
- The sample user utterance 1220, 1222, 1224 is obtained from the list of matched user utterances 944 that contains a subset $\{i_0, i_1, \ldots, i_m\}$ of user utterances by taking the user utterance $i_k$ with the smallest specificity.

Maximized Representation of Patterns

FIG. 13 is an illustration of a user interface 1300 in an example implementation showing a maximized representation of a pattern. In this example, the maximized representation displays additional user utterances 1302, 1304, 1306, 1308, and the actions available on the pattern. Each user utterance 1220, 1302, 1304, 1306, 1308 is also illustrated as being associated with a control 1310, 1312, 1314, 1316, 1318 that is selectable to cause display of a conversation containing that user utterance 1220, 1302, 1304, 1306, 1308. Example actions that are made available to the reviewer include moving 1320 the pattern to another agent intent, disabling the pattern 1322, or deleting the pattern 1324.

Additionally, when displaying a user utterance 1220, 1302, 1304, 1306, 1308, a visual treatment may be employed to indicate:

Which words in the user utterance caused the user utterance to match to the given pattern, examples of which are underlined in the example user interface 1300 although other visual treatments are also contemplated.

Words that are not included in the agent's lexicon, examples of which are displayed in bold in the example user interface 1300 although other visual treatments are also contemplated.

When the web application 946 of FIG. 9 displays a pattern using the maximized representation 1300, it may use the information stored in the pattern database 934 and the missing word database 1102 as follows:

The popularity 1208 is based on pattern activation frequency 942;

The sample user utterances 1220, 1302, 1304, 1306, 1308 are obtained from the list of matched user utterances 944 that contains a subset $\{i_0, i_1, \ldots, i_m\}$ of user utterances by taking user utterances $i_1 \ldots i_k$ in increasing order of specificity. In the example shown k=5 although other values for k are also contemplated;

The links to conversations 1310, 1312, 1314, 1316, 1318 are generated using the stored conversation unique identifiers;

The matched words are highlighted using the mapping described previously; and

The missing words are highlighted using the information stored in the missing word database 1102.

Representation of Patterns Associated with a Conversational Agent Intent

As previously described, a conversational agent's 104 intent may be associated with multiple patterns. Additionally, direct patterns may be used to trigger the agent intent upon comparison. Indirect patterns may be used to add the intent to a list of reformulations of the user's question in an instance in which direct patterns are not activated.

The reviewer may use the web application 946 of FIG. 9 to display an agent's intent and its associated patterns, an example of which is shown in the example implementation of a user interface 1400 in FIG. 14. As illustrated, a reviewer may independently maximize or minimize the patterns for each conversational agent intent to view patterns of interest.

Visual Display of Missing Words

In some instances, expansion of a conversational agent's lexicon 410 may improve operation of the agent. To do this, incoming user utterances may be scanned for words that are not already in the lexicon 410. To improve efficiency of the process, the most commonly occurring missing words may be added first to the agent's lexicon 410, thereby likely achieving a greater effect in comparison with missing words that are not as commonly used.

In some cases, the missing words simply involve spelling errors that the spell checker was or was not able to correct. The missing words may also be relatively uncommon in the standard language. In other cases, these missing words are the names of features, products, brands, companies, or other terms specific to that conversational agent. As a company introduces new products, services, and terms, the conversational agent's lexicon 410 can be enhanced.

To help a reviewer in deciding whether to add the missing word and what it means, the user interface may display the word in the context of several input sentences containing that word. For example, corresponding user conversations may be made available for the user utterances.

Figure 15:
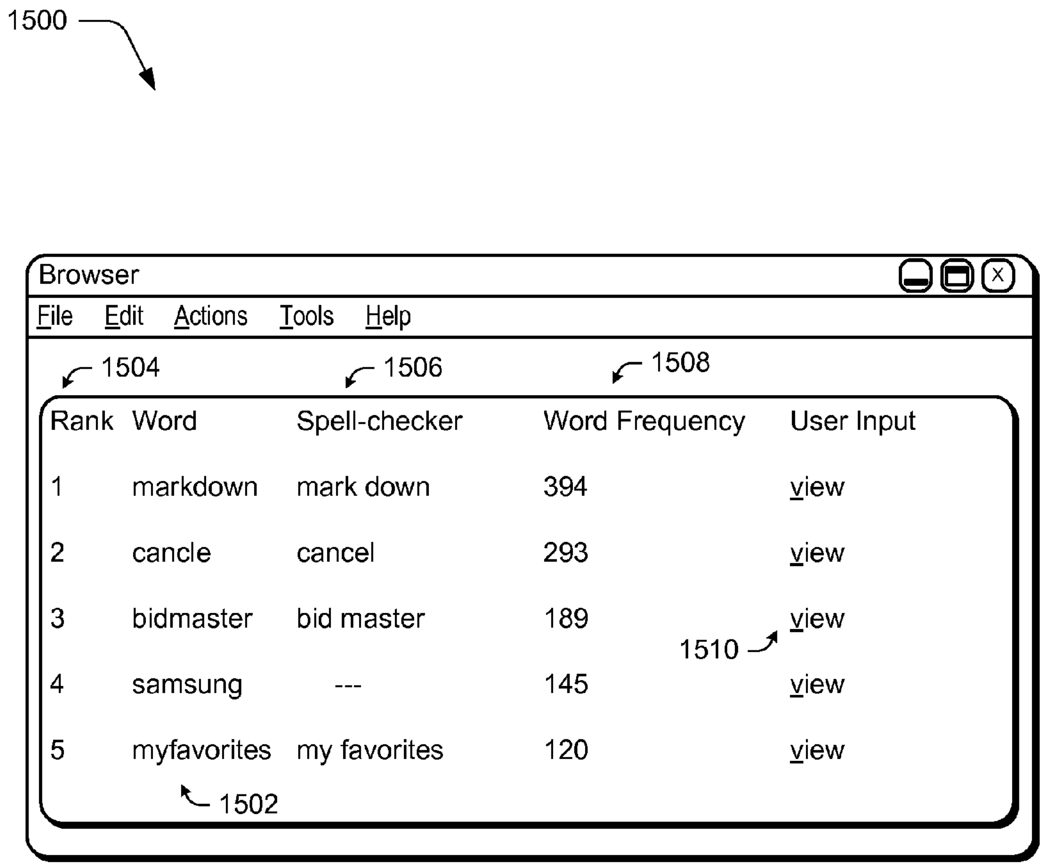
FIG. 15 is an illustration of an example user interface showing one or more missing words.

FIG. 15 illustrates an example implementation of a user interface 1500 generated by the web application 946 of FIG. 11 to display a list of missing words. In the illustrated user interface 1500, words 1502 are ranked 1504 in an order from most to least frequently occurring as observed in user utterances, and displayed in this order. Spell-checker suggestions 1506, when available, are also listed to aid the reviewer in determining whether the spell checker was successful in correcting the word. Additionally, the reviewer may open a window for each word that shows a sample of real user utterances containing this word by activating a control 1510.

When the web application 946 of FIG. 11 displays missing words using the representation 1500, it may use the information stored in the missing word database 1102 as follows:

The missing words 1502 are displayed based on the missing word entries 1104, by using the word spelling 1106.

Possible spell checker suggestions 1506 are displayed based on the stored spell check suggestions 1108.

The frequency information 1508 is based on the occurrence count 1110.

The missing word entries are sorted based on their rank 1504, which is calculated by ordering the missing word entries 1104 in the missing word database 1102 according to decreasing occurrence count 1110.

Figure 16:
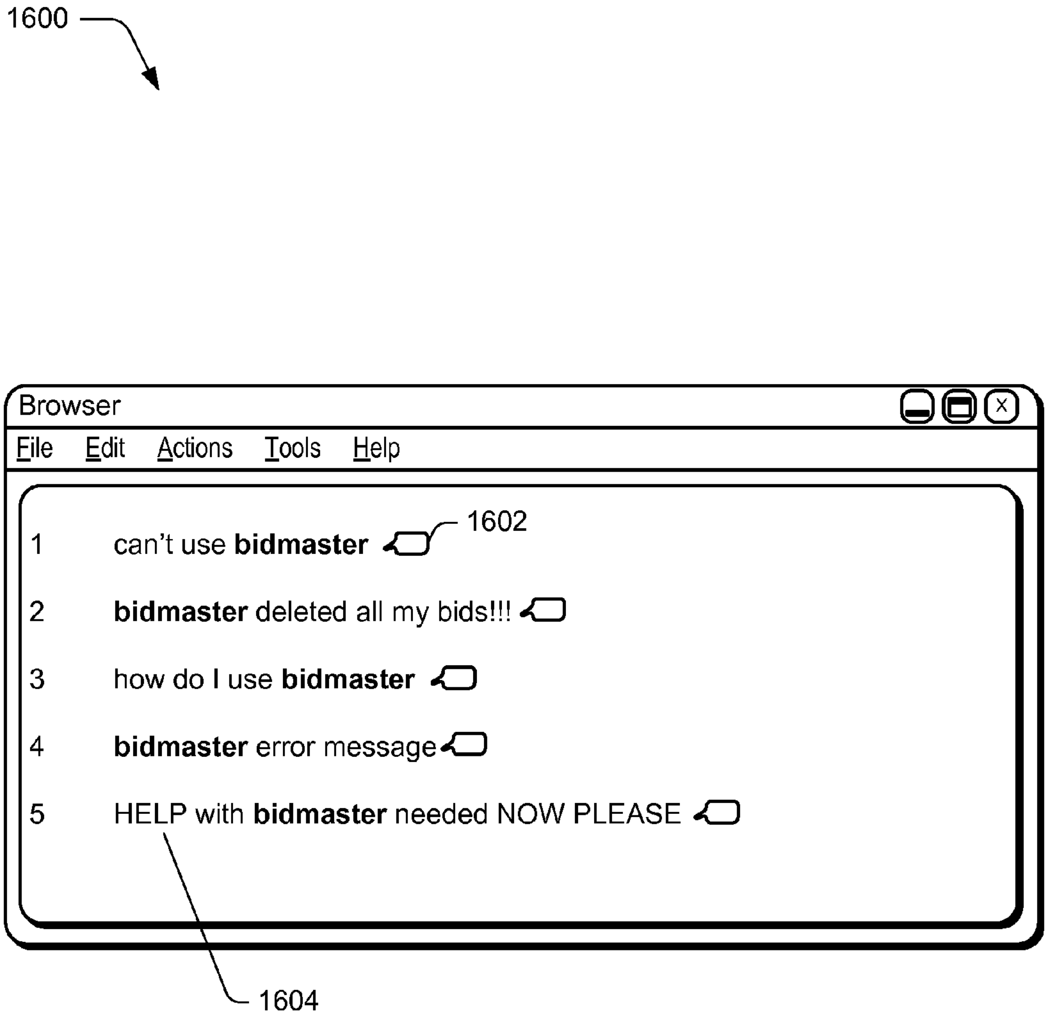
FIG. 16 is an illustration of an example user interface showing a context of one or more missing words that is displayed responsive to selection of a control displayed in the example user interface of FIG. 15.

A result of activation of the control 1510 is illustrated in an example user interface 1600 of FIG. 16 (the example uses the missing word "bidmaster" for illustrative purposes). For each user utterance 1604, the reviewer may also view a full conversation containing this user utterance by selecting another control 1602 as previously described.

When the web application 946 of FIG. 11 displays the interface 1600, it may use the list of user utterances 112 stored in the missing word database 1102 to display the list of sample user utterances corresponding to a missing word. Again, although words were described in the missing word examples, a wide variety of types of user utterances are contemplated, such as phrases, abbreviations, short hand, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computer processors, the method comprising:

generating, through a linguistic analysis, a semantic graph of a user utterance received by a conversational agent implementing an automated interactive natural language conversational dialog with a user, the conversational dialog modeled as paths through a set of decision trees;

identifying a plurality of candidate graph patterns based upon a current position of the conversational dialog in the set of decision trees;

comparing through use of one or more distance measuring metrics, the semantic graph of the user utterance with the plurality of candidate graph patterns to determine a given graph pattern from among the plurality of candidate graph patterns corresponding to the user utterance, the given graph pattern being a matching graph pattern and comprising a plurality of graph fragments, wherein each graph fragment occurs in the semantic graph of the user utterance or the matching graph pattern being subsumed by a subgraph of the semantic graph of the user utterance; and displaying the utterance in an electronic user interface as a representation of the matching graph pattern, the displayed utterance facilitating improvement to the conversational agent.

2. A method as described in claim 1, wherein the displaying includes displaying a control that is selectable to expand the representation to include another utterance that has been indicated as corresponding to the matching graph pattern through linguistic analysis.

3. A method as described in claim 2, wherein the displaying of the utterance and the other utterance are ordered by specificity in the user interface.

4. A method as described in claim 1, wherein the displaying includes displaying an indication that describes popularity of the matching graph pattern in a corpus of utterances that was a subject of the linguistic analysis.

5. A method as described in claim 1, wherein the displaying includes displaying in the user interface a link that is selectable to navigate to a conversation that includes the utterance.

6. A method as described in claim 1, wherein the displaying is performed to indicate which words in the utterance served as a basis to determine that the utterance corresponds to the matching graph pattern.

7. A method as described in claim 1, wherein the displaying is performed to indicate which words in the utterance are not included in a lexicon that is utilized to perform the linguistic analysis.

8. A method as described in claim 7, wherein at least one of the words is a misspelling.

9. A method as described in claim 1, wherein the displaying is performed for a plurality of said utterances that correspond to a respective one of a plurality of said graph patterns of an intent.

10. A method as described in claim 1, wherein the interactive natural language dialog is a textual chat between the user and the conversational agent.

11. A method as described in claim 1, wherein comparing, through use of the one or more distance measuring metrics, the semantic graph of the user utterance with the plurality of candidate graph patterns includes:

assigning a matching distance to each successful match between the semantic graph of the user utterance and a respective one of the plurality of candidate graph patterns; and selecting the matching graph pattern as a respective one of the plurality of candidate graph patterns with a smallest matching distance.

12. A method as described in claim 1, wherein comparing, through use of the one or more distance measuring metrics, the semantic graph of the user utterance with the plurality of candidate graph patterns includes measuring a distance between the semantic graph of the user utterance and at least one of the plurality of candidate graph patterns.

13. A data processing system including one or more processors, the system comprising:

a conversational agent, executing on the one or more processors, the conversational agent configured to process a user utterance received by the conversational agent while implementing an automated interactive natural language conversational dialog between the conversational agent and a user, the conversational dialog modeled as paths through a set of decision trees and the conversational agent configured to:

generate, through a linguistic analysis, a semantic graph of the user utterance;

identify a plurality of candidate graph patterns based upon a current position of the conversational dialog in the set of decision trees;

compare, through use of one or more distance measuring metrics, the semantic graph of the user utterance with the plurality of candidate graph patterns to determine a given graph pattern from among the plurality of candidate graph patterns corresponding to the user utterance, the given graph pattern being a matching graph pattern and comprising a plurality of graph fragments, wherein each graph fragment occurs in the semantic graph of the user utterance or the matching graph pattern being subsumed by a subgraph of the semantic graph of the user utterance; and a display configured to display the utterance in a user interface as a representation of the matching graph pattern, the displayed utterance facilitating improvement to the conversational agent.

14. A data processing system as described in claim 13, wherein the display is further configured to display an indication that describes popularity of the matching graph pattern in a corpus of utterances that was a subject of the linguistic analysis.

15. A data processing system as described in claim 13, wherein the display is further configured to display in the user interface a link that is selectable to navigate to a conversation that includes the utterance.

16. A data processing system as described in claim 13, wherein the display is further configured to indicate which words in the utterance are not included in a lexicon that is utilized to perform the linguistic analysis.

17. A data processing system as described in claim 13, wherein at least one of the words in the user utterance, received in connection with the dialog with a user, is a misspelling.

* * * * *